(12) United States Patent
Lee et al.

(10) Patent No.: US 10,860,612 B2
(45) Date of Patent: Dec. 8, 2020

(54) PARALLEL REPLICATION ACROSS FORMATS

(71) Applicant: SAP SE, Walldorf (DE)

(72) Inventors: Juchang Lee, Seoul (KR); Hyoung Jun Na, Seoul (KR); Kyu Hwan Kim, Seoul (KR); Deok Hoe Kim, Seoul (KR); Chang Gyoo Park, Seoul (KR)

(73) Assignee: SAP SE, Walldorf (DE)

( * ) Notice: Subject to any disclaimer, the term of this patent is extended or adjusted under 35 U.S.C. 154(b) by 225 days.

(21) Appl. No.: 16/014,935

(22) Filed: Jun. 21, 2018

(65) Prior Publication Data

US 2019/0325055 A1    Oct. 24, 2019

Related U.S. Application Data

(60) Provisional application No. 62/660,138, filed on Apr. 19, 2018.

(51) Int. Cl.
| | |
|---|---|
| *G06F 16/27* | (2019.01) |
| *G06F 11/14* | (2006.01) |
| *G06F 3/06* | (2006.01) |
| *G06F 16/17* | (2019.01) |
| *G06F 16/182* | (2019.01) |

(Continued)

(52) U.S. Cl.
CPC ............ *G06F 16/273* (2019.01); *G06F 3/067* (2013.01); *G06F 3/0613* (2013.01); *G06F 3/0644* (2013.01); *G06F 11/1448* (2013.01); *G06F 16/1734* (2019.01); *G06F 16/1844* (2019.01); *G06F 16/24539* (2019.01); *G06F 16/24552* (2019.01)

(58) Field of Classification Search
None
See application file for complete search history.

(56) References Cited

U.S. PATENT DOCUMENTS

| | | | | |
|---|---|---|---|---|
| 5,440,727 A | * | 8/1995 | Bhide | G06F 16/273 |
| | | | | 711/117 |
| 6,014,674 A | * | 1/2000 | McCargar | G06F 16/284 |
| 6,754,666 B1 | * | 6/2004 | Brookler | G06Q 10/0875 |

(Continued)

OTHER PUBLICATIONS

Zhang, RC File data placement structure, Ohio State University, 2011.*

(Continued)

*Primary Examiner* — Wilson Lee
(74) *Attorney, Agent, or Firm* — Sterne, Kessler, Goldstein & Fox P.L.L.C.

(57) ABSTRACT

Disclosed herein are system, method, and computer readable device embodiments for parallel replication of databases across row-store and column-store table formats. An embodiment operates by maintaining a replication log and a storage-level recovery log formatted according to separate respective log formats, logging a record-level SQL execution result, and replicating at least one database table from a primary server to at least one replica server. The primary server and the at least one replica server may each be configured to store data according to one table format of a row-store table format and a column-store table format, such that the primary server's table format is different from the at least one replica server's table format.

20 Claims, 19 Drawing Sheets

(51) Int. Cl.
G06F 16/2453 (2019.01)
G06F 16/2455 (2019.01)

(56) References Cited

U.S. PATENT DOCUMENTS

| | | | |
|---|---|---|---|
| 2014/0172794 A1* | 6/2014 | Bartholoma | G06F 16/27 |
| | | | 707/634 |
| 2015/0293945 A1* | 10/2015 | Amrhein | G06F 16/278 |
| | | | 707/722 |
| 2016/0147617 A1 | 5/2016 | Lee et al. | |
| 2016/0147618 A1 | 5/2016 | Lee et al. | |
| 2016/0147858 A1 | 5/2016 | Lee et al. | |
| 2016/0147859 A1 | 5/2016 | Lee et al. | |
| 2017/0147671 A1 | 5/2017 | Bensberg et al. | |
| 2017/0168903 A1* | 6/2017 | Dornemann | G06F 9/45558 |
| 2018/0046551 A1* | 2/2018 | Bourbonnais | G06F 11/1451 |
| 2018/0113766 A1* | 4/2018 | Bourbonnais | G06F 16/275 |
| 2018/0143881 A1* | 5/2018 | Singer | G06F 11/2097 |
| 2018/0143884 A1* | 5/2018 | Brunzema | G06F 11/1471 |
| 2018/0322157 A1* | 11/2018 | Lee | H04L 67/1095 |

OTHER PUBLICATIONS

Bailis, P., Venkataraman, S., Franklin, M.J., Hellerstein, J.M., Stoica, I., "Quantifying eventual consistency with PBS" The VLDB Journal 23(2), 279-302 (2014).
Bornea, M.A., Hodson, O., Elnikety, S., Fekete, A., "One-copy serializability with snapshot isolation under the hood," Proceedings of the 27th IEEE ICDE Conference, pp. 625-636 (2011).
Breitbart, Y., Komondoor, R., Rastogi, R., Seshadri, S., Silberschatz, A., "Update propagation protocols for replicated databases," Proceedings of the ACM SIGMOD Conference, pp. 97-108 (1999).
Cecchet, E., Candea, G., Ailamaki, A., "Middleware-based database replication: the gaps between theory and practice," Proceedings of the ACM SIGMOD Conference, pp. 739-752 (2008).
Chairunnanda, P., Daudjee, K., Özsu, M.T., "ConfluxDB: Multi-master replication for partitioned snapshot isolation databases," PVLDB, 7(11), pp. 947-958 (2014).
Corbett, J.C., Dean, J., Epstein, M., Fikes, A., Frost, C., Furman, J.J., Ghemawat, S., Gubarev, A., Heiser, C., Hochschild, P., et al., "Spanner: Googles globally distributed database," ACM Transactions on Computer Systems, 31(3), 8 (2013).
Curino, C., Jones, E., Zhang, Y., Madden, S., "Schism: a workload-driven approach to database replication and partitioning," Proceedings of the VLDB Endowment. 3(1-2), pp. 48-57 (2010).
Das, S., Botev, C., Surlaker, K., Ghosh, B., Varadarajan, B., Nagaraj, S., Zhang, D., Gao, L., Westerman, J., Ganti, P., et al., "All aboard the databus!: LinkedIn's scalable consistent change data capture platform," Proceedings of the Third ACM Symposium on Cloud Computing, p. 18 (2012).
Daudjee, K., Salem, K., "Lazy database replication with snapshot isolation," Proceedings of the VLDB Conference, pp. 715-726 (2006).
Elnikety, S., Dropsho, S.G., Pedone, F., "Tashkent: uniting durability with transaction ordering for high-performance scalable database replication," Proceedings of the EuroSys Conference, pp. 117-130 (2006).
Färber, F., May, N., Lehner, W., Große, P., Müller, I., Rauhe, H., Dees, J., "The SAP HANA Database—an architecture overview," IEEE Data Eng'g Bull., 35(1), pp. 28-33, (2012).
Galante, G., de Bona, L.C.E., "A survey on cloud computing elasticity," 2012 IEEE Fifth International Conference on Utility and Cloud Computing (UCC), pp. 263-270, IEEE (2012).
Gray, J., Helland, P., O'Neil, P., Shasha, D., "The dangers of replication and a solution," ACM SIGMOD Record, 25(2), pp. 173-182 (1996).
Heinze, T., Jerzak, Z., Hackenbroich, G., Fetzer, C., "Latency-aware elastic scaling for distributed data stream processing systems," Proceedings of the 8th ACM International Conference on Distributed Event-Based Systems, pp. 13-22, ACM (2014).

Herbst, N.R., Kounev, S., Reussner, R.H., "Elasticity in cloud computing: What it is, and what it is not," ICAC, pp. 23-27 (2013).
Hong, C., Zhou, D., Yang, M., Kuo, C., Zhang, L., Zhou, L., "KuaFu: Closing the parallelism gap in database replication," Proceedings of the 29th IEEE ICDE Conference, pp. 1186-1195 (2013).
Kemme, B., Alonso, G., "Don't be lazy, be consistent: Postgres-R, a new way to implement database replication," Proceedings of the 26th VLDB Conference, pp. 134-143 (2000).
Kemper, A., Neumann, T., "Hyper: A hybrid OLTP&OLAP main memory database system based on virtual memory snapshots," Proceedings of IEEE ICDE Conference, pp. 195-206 (2011).
Kreps, J., Narkhede, N., Rao, J., et al., "Kafka: A distributed messaging system for log processing," Proceedings of the NetDB, pp. 1-7 (2011).
Krueger, J., Kim, C., Grund, M., Satish, N., Schwalb, D., Chhugani, J., Plattner, H., Dubey, P., Zeier, A., "Fast updates on read-optimized databases using multi-core CPUs," PVLDB 5(1), pp. 61-72 (2011).
Lee, J., Kim, K., Cha, S.K., "Differential logging: A commutative and associative logging scheme for highly parallel main memory database," Proceedings of the 17th IEEE ICDE Conference, pp. 173-182 (2001).
Lee, J., Kwon, Y.S., Färber, F., Muehle, M., Lee, C., Bensberg, C., Lee, J. Y., Lee, A. H., Lehner, W., "SAP HANA distributed in-memory database system: Transaction, session, and metadata management," Proceedings of the 29th IEEE ICDE Conference, pp. 1165-1173 (2013).
Lee, J., Moon, S., Kim, K.H., Kim, D.H., Cha, S.K., Han, W.S., Parallel replication across formats in SAP HANA for scaling out mixed OLTP/OLAP workloads, PVLDB, 10(12), pp. 1598-1609 (2017).
Lee, J., Shin, H., Park, C.G., Ko, S., Noh, J., Chuh, Y., Stephan, W., Han, W.S., "Hybrid garbage collection for multi-version concurrency control in SAP HANA," Proceedings of the ACM SIGMOD Conference, pp. 1307-1318 (2016).
Li, B., Ruan, Z., Xiao, W., Lu, Y., Xiong, Y., Putnam, A., Chen, E., Zhang, L., "Kv-direct: High-performance in-memory key-value store with programmable nic," Proceedings of the 26th Symposium on Operating Systems Principles, pp. 137-152, ACM (2017).
Makreshanski, D., Giceva, J., Barthels, C., Alonso, G., "BatchDB: Efficient isolated execution of hybrid OLTP+ OLAP workloads for interactive applications," Proceedings of the ACM SIGMOD Conference, pp. 37-50 (2017).
May, N., Böhm, A., Block, M., Lehner, W., "Managed query processing within the SAP HANA database platform," Datenbank-Spektrum, 15(2), pp. 141-152 (2015).
May, N., Böhm, A., Lehner, W., "SAP HANA—the evolution of an in-memory DBMS front pure OLAP processing towards mixed workloads," Datenbanksysteme für Business, Technologie und Web, BTW, (2017).
Mühlbauer, T., Rödiger, W., Reiser, A., Kemper, A., Neumann, T., et al., Scyper: A hybrid OLTP&OLAP distributed main memory database system for scalable real-time analytics, BTW, pp. 499-502 (2013).
Pacitti, E., Simon, E., "Update propagation strategies to improve freshness in lazy master replicated databases," The VLDB Journal, 8(3-4), 305-318 (2000).
Patterson, S., Elmore, A.J., Nawab, F., Agrawal, D., El Abbadi, A., "Serializability, not serial: Concurrency control and availability in multi-datacenter datastores," PVLDB 5(11), 1459-1470 (2012).
Perez-Sorrosal, F., Patiño-Martinez, M., Jimenez-Peris, R., Kemme, B., "Elastic si-cache: consistent and scalable caching in multi-tier architectures," The VLDB Journal, 20(6), 841-865 (2011).
Plattner, C., Alonso, G., "Ganymed: Scalable Replication for Transactional Web Applications," Proceedings of the ACM USENIX middleware Conference, pp. 155-174 (2004).
Plattner, H., "A common database approach for OLTP and OLAP using an in-memory column database," Proceedings of the ACM SIGMOD Conference, pp. 1-2. ACM (2009).
Psaroudakis, I., Wolf, F., May, N., Neumann, T., Böhm, A., Ailamaki, A., Sattler, K.U., "Scaling up mixed work-loads: a battle of data

(56) References Cited

OTHER PUBLICATIONS freshness, flexibility, and scheduling," Technology Conference on Performance Evaluation and Benchmarking, pp. 97-112, Springer (2014).

Putnam, A., Caulfield, A. M., Chung, E. S., Chiou, D., Constantinides, K., Demme, J., Esmaeilzadeh, H., Fowers, J., Gopal, G.P., Gray, J., et al., "A reconfigurable fabric for accelerating large-scale datacenter services," 2014 ACM/IEEE 41st International Symposium on Computer Architecture (ISCA), pp. 13-24, IEEE (2014).

M. Bore-Wuesthof, SAP, "Introduction: High availability for SAP HANA," (Jan. 27, 2016, 19:37 PM), https://archive.sap.com/documents/docs/DOC-65585.

L. Kiesow, SAP, "Introducing the new SAP HANA capture and replay tool, available with SAP HANA SPS12," (Jun. 14, 2016), https://blogs.sap.com/2016/06/14/introducing-the-new-sap-hana-capture-and-replay-tool-available-with-sap-hana-sps12/.

SAP, "SAP LT Replication Server (SLT) Community," http://www.sap.com/community/topic/lt-replication-server.html (last visited Apr. 3, 2018).

Simitsis, A., Vassiliadis, P., Sellis, T., "Optimizing ETL processes in data warehouses," Proceedings of the 21st IEEE ICDE Conference, pp. 564-575 (2005).

Sousa, F.R., Machado, J.C., "Towards elastic multi-tenant database replication with quality of service," Proceedings of the 2012 IEEE/ACM Fifth International Conference on Utility and Cloud Computing, IEEE Computer Society, pp. 168-175 (2012).

Vogels, W. "Eventually consistent," Communications of the ACM, 52(1), pp. 40-44 (2009).

Weikum, G., Vossen, G., "Transactional information systems: theory, algorithms, and the practice of concurrency control and recovery," Elsevier (2001).

Willhalm, T., Popovici, N., Boshmaf, Y., Plattner, H., Zeier, A., Schaffner, J., "SIMD-Scan: ultra fast in-memory table scan using on-chip vector processing units," Proceedings of the VLDB Endowment, 2(1), pp. 385-394 (2009).

U.S. Appl. No. 62/084,065, filed Nov. 25, 2014.

Mohan, C., Treiber, K., Obermarck, R., "Algorithms for the Management of Remote Backup Data Bases for Disaster Recovery," Proceedings of IEEE 9th International Conference on Data Engineering, pp. 511-518 (1993).

King, R.P., Halim, N., Garcia-Molina, H., Polyzois, C.A., "Management of a Remote Backup Copy for Disaster Recovery," ACM Transactions on Database Systems 16(2), pp. 338-368 (1991).

\* cited by examiner

PARALLEL REPLICATION ACROSS FORMATS

CROSS-REFERENCE TO RELATED APPLICATIONS

This application claims the benefit of U.S. Provisional Patent Application No. 62/660,138, filed Apr. 19, 2018, entitled "Parallel Replication Across Formats for Scaling Out Mixed OLTP/OLAP Workloads in Main-Memory Databases," the entirety of which is hereby incorporated by reference. This application is also related to U.S. patent application No. 62/084,065, filed Nov. 25, 2014, entitled "Table Replication"; Ser. No. 14/657,854, filed Mar. 13, 2015, entitled "Log Forwarding to Avoid Deadlocks During Parallel Log Replay in Asynchronous Table Replication," now U.S. Pat. No. 9,965,359; Ser. No. 14/657,865, filed Mar. 13, 2015, entitled "Data Synchronization with Minimal Table Lock Duration in Asynchronous Table Replication"; Ser. No. 14/657,938, filed Mar. 13, 2015, entitled "RowID-Based Data Synchronization for Asynchronous Table Replication," now U.S. Pat. No. 9,965,360; Ser. No. 14/657,948, filed Mar. 13, 2015, entitled "Transactional and Parallel Log Replay for Asynchronous Table Replication," now U.S. Pat. No. 9,959,178; and Ser. No. 14/946,757, filed Nov. 19, 2015, entitled "Query Hints for Caching and Replication." These applications are also hereby incorporated by reference in their entirety.

BACKGROUND

Modern database systems need to support mixed workloads of online transaction processing (OLTP) and online analytical processing (OLAP) workloads. OLTP workloads contain short-lived, light transactions which read or update small portions of data, while OLAP workloads contain long-running, heavy transactions which reads large portions of data. That is, transactional and analytical behaviors are mixed in today's workloads. In some embodiments, row store formats may be used for handling OLTP workloads, with column store formats being used for handling OLAP workloads.

A conventional approach to support such mixed workloads is to isolate OLTP and OLAP workloads into separate, specialized database systems, periodically replicating operational data into a data warehouse for analytics. Here, external database tools may be used, such as ETL (Extraction-Transformation-Loading), for example. However, this conventional ETL-style, application-driven data replication between two different OLTP and OLAP systems is inherently unable to achieve real-time reporting. OLTP and OLAP workloads conventionally may be run on a single machine, although this approach may incur other expenses with respect to hardware. Conventional systems may focus on scaling up mixed workloads in a single hardware host, which may also eventually limit the maximum scalability of analytical query processing.

In general, data replication is a widely studied and popular mechanism for achieving higher availability and higher performance. However, there is little work on conventional replication from row store to column store for enhancing scalability of analytical query processing. Middleware-based replication, which may typically be used for replication across different (and heterogeneous) database management system (DBMS) instances, may not be directly comparable to the architecture described herein, in which the primary server (also referred to herein as "the primary") and the replicas may belong to the same database schema and common transaction domain. An additional limitation of conventional parallel log replayers is that they are typically not scalable due to contention of inter-transaction dependency checking.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

1. Introduction

Figure 1:
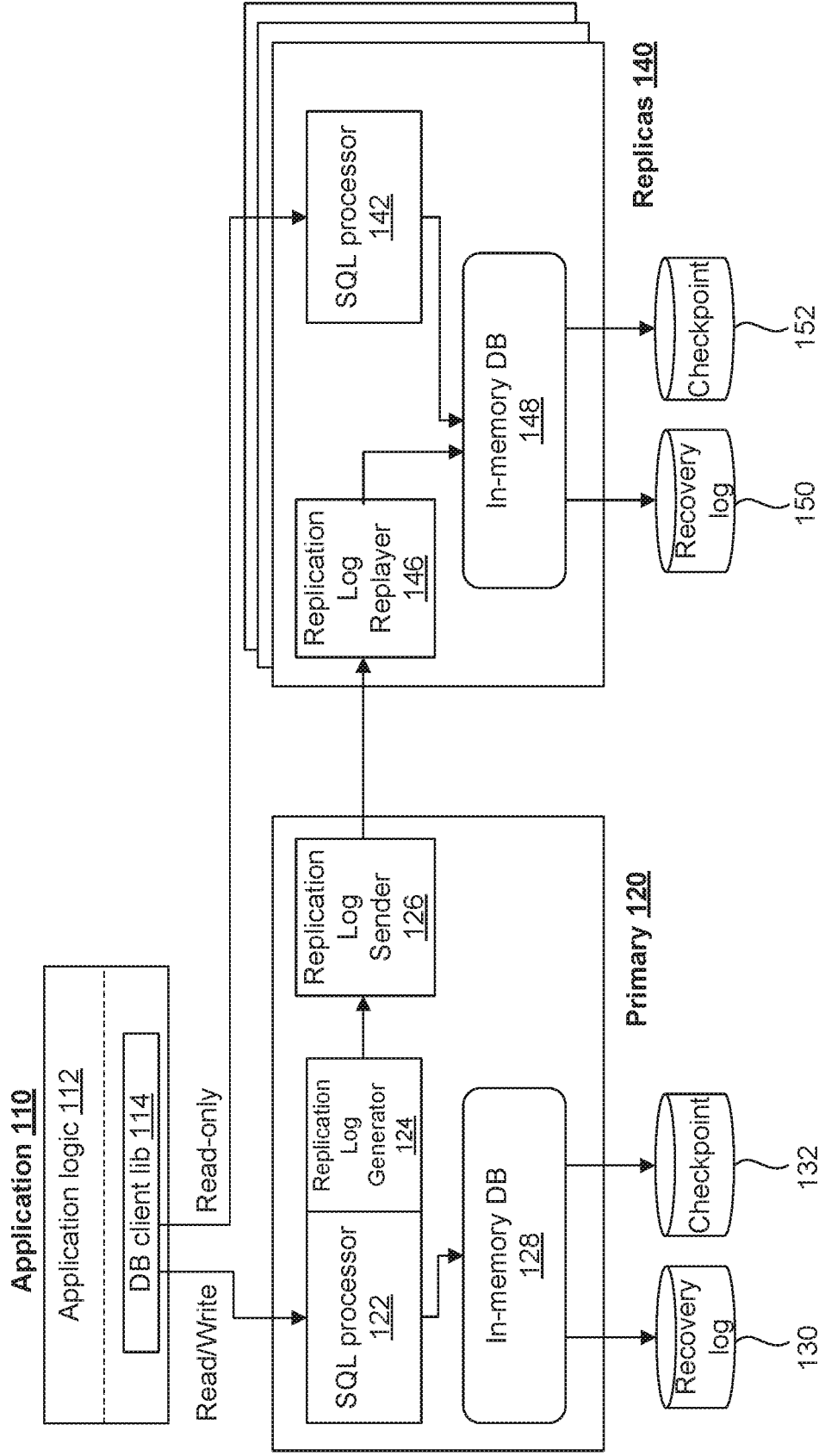
FIG. 1 shows an example of overall architecture, according to some embodiments described herein.

From analysis of various customer workloads, one modern server machine may sufficiently handle OLTP workloads while heavy OLAP workloads may need to be processed in different machines. This architecture may be realized through database replication. In this situation, both real-time reporting and scalable reporting on operational data may be needed. In order to support real-time reporting, it may be beneficial to reduce propagation delay between OLTP transactions and reporting OLAP queries. In order to support scalable reporting, query processing throughput may be able to increase accordingly with the increasing number of replicas, elastically depending on the volume of the incoming workloads.

Asynchronous Parallel Table Replication (also referred to as Asynchronous Table Replication or ATR) as described herein is a novel database replication architecture designed to incur low overhead to transaction processing at the primary server's site while it may support scalability of the analytical query performance and may show less CPU consumption for replayed transactions. In addition, with parallel log replay as described herein and early log shipping mechanisms also described herein, ATR may reduce the propagation delay (snapshot delay) between the primary server and the replicas under lazy replication while ATR may improve the primary server's transaction performance using eager replication.

ATR may yield benefits including database replication architecture for real-time analytical queries on operational data, lock-free parallel log replay scheme utilizing record version identifier (RVID) to apply record-wise partial ordering for reducing propagation delay, log-less replica recovery scheme utilizing characteristics of in-memory column stores in order to improve performance of replica recovery and to reduce logging overhead, and a framework for adaptive query routing depending on predefined maximum acceptable staleness ranges of queries, among other possible benefits.

ATR may be further enhanced with optimistic interleaving to increase parallelism of log replay even for high-conflict workloads where multiple concurrent transactions try to update the same records, eager parallel replication mechanisms utilizing ATR's parallel log replay with early log shipping and log-less replica recovery, and lighter-weight implementations of ATR log replayers to lower CPU consumption at the replicas and thus to increase the CPU capacity for more OLAP workloads.

Additional gains may be realized with ATR when using multi-version concurrency control (MVCC) to enable real-time reporting by reducing propagation delay between primary server and replicas, adaptive query routing protocol for gracefully handling replica-side errors, and wait-and-forward scheme proposed to deal with transactional consistency issues arising with lazy replication, among other possible streamlining of ATR for further performance improvements.

ATR as disclosed herein is further capable of sub-table replication, cross-format replication, semi-multi-master replication, log forwarding for efficiently handling log serialization errors, replication log buffer management for reducing contention at the primary, log compression, and online non-disruptive replica addition protocol for elastic scaling in cloud environments, among other possible extensions to core functionality.

2 Architecture and Design Choices

2.1 Overall Architecture

FIG. 1 shows the overall architecture of ATR. The ATR system 100 may include a primary server 120 and one or more replica servers 140, each of which may have an SQL processor 122 or 142, an in-memory database 128 or 148, and a local recovery log 130 or 150 and checkpoint 132 or 152. Each server may be connected with another by a network interconnect. In some embodiments, the network interconnect may be a generic or commodity network interconnect, without any specific requirement for shared storage. Write requests may be automatically directed to the primary server 120 by the database client library 114, embedded in the application 110 process employing application logic 112. During the course of processing a received write request, the primary server 120 may generate a replication log entry if the write request makes any change to a replication-enabled table. ATR may be applied to a selected list of tables, not necessarily replicating the entire database. The generated replication log entry is shipped to the replicas 140 via the network interconnect and then replayed at the replicas 140. By replaying the propagated replication log entries at replication log replayer 146, the in-memory database 148 may make copies of the replicas 140 to be maintained in a queriable and transactionally consistent state. The database client library 114 may transparently and dynamically route read-only queries to the replicas 140 in some cases where the replica database state may meet specified freshness requirements for the queries. By contrast, the primary 120 may also handle read/write queries directly.

Although ATR may also be extended for high availability or disaster recovery purposes, one purpose of ATR in some embodiments may be to offload OLAP-style analytical workloads from the primary server 120, which may be reserved for handling OLTP-style transactional workloads, for example. Additionally, by having multiple replicas 140 for the same primary 120 table, ATR may elastically scale out the affordable volume of the OLAP-style analytical workloads. Moreover, by configuring the primary 120 table as an OLTP-favored in-memory row store while configuring its replicas 140 as OLAP-favored in-memory column stores, in some embodiments, ATR may increase the processing capability of OLTP/OLAP mixed workloads under the common database schema and the single transaction domain.

2.2 Design Choices

Under the overall architecture and design goals, Table 1 shows some of the practical design decisions during the development of ATR for commercial enterprise in-memory database systems, in some embodiments. These design decisions may be grouped into three categories, depending on where each decision is affected, being one of the following: (a) both primary and replicas (Table 1a), (b) primary only (Table 1b), and (c) replicas only (Table 1c):

Table 1: Summary of ATR design decisions

TABLE 1a

| | Common |
|---|---|
| D1.1 | Replicate across formats (including across row store format and column store format) |
| D1.2 | Decouple and separate the replication log from the storage-level recovery log |

TABLE 1b

| | Primary server |
|---|---|
| D2.1 | Tightly couple the replication log generator and sender within the DBMS engine |
| D2.2 | Log the record-level SQL execution result to avoid non-deterministic behaviors and the potential conflict during parallel log replay |
| D2.3 | Ship generated replication log entries as soon as execution of its DML statement is completed |

TABLE 1c

| | Replicas |
|---|---|
| D3.1 | Perform parallel log replay in replicas to reduce visibility delay |
| D3.2 | Enable adaptive query routing depending on its predefined max acceptable staleness range |
| D3.3 | Make replayer transactions light-weight to spare more CPU resource for OLAP processing at the replicas |
| D3.4 | Support efficient post-failure replica recovery |

The following explains each decision and its rationale in more detail: First, ATR replicates across different table formats (D1.1). By providing both the OLTP-favored in-memory row store and the OLAP-favored the in-memory column store, replicating from a row store to a column store may be an advantageous option for the cases that require higher OLTP and OLAP performance together.

Second, the replication log may be decoupled and separated from the storage-level recovery log that may be generated for database recovery (D1.2). In systems designed to work across different table formats, such as with ATR, it may be more difficult to rely on an existing recovery log, in some embodiments, which may be tightly coupled with the physical format of the target table type (for example, differential logging for the row store). There may be multiple application use cases in which replicating only a selected list of tables may be sufficient and efficient, instead of replicating the tables in the database. Since the storage-level recovery log may be organized as a single ordered stream for the entire database, it may generate an additional overhead to extract the redo logs of a few particular tables from the global log stream. Moreover, in order to reduce disruptive change in an underlying storage engine, a practical design decision was made to decouple the newly-developed replication engine from the existing underlying storage engines.

Third, the record-level SQL execution result (called record-level result logging) may be logged instead of executed SQL operation itself (called operation logging) (D2.2). If the executed SQL string were logged as it is, the replica database state may become inconsistent with the state of the primary because of the non-deterministic SQL functions or because of dependency on database state at the time of log replay. For example, the execution order of the following two update statements may depend on the parameter value of the first statement, but it may require a more complicated comparison method to infer that these two statements have a dependency with each other or may lead to restrictive parallelism during log replay. In contrast to the operation logging, the record-level result logging may be free from such non-deterministic behaviors, and potential conflict between two different log entries may be easily detected by using RVID, which may be explained in more detail in Section 3.3.

update table1 set col1=? where col2='B';
update table1 set col3='C' where col1='A';

Fourth, although ATR supports both lazy (or asynchronous) replication and eager (or synchronous) replication, lazy replication may be chosen to reduce the latency overhead to the write transactions running at the primary. In the lazy replication, a transaction may commit without waiting for its replication log propagation to the replicas. As a side effect, it may happen that a query executed at the replicas may refer to an outdated database state. Although such a visibility delay is unavoidable under the lazy replication, additional design decisions may reduce visibility delay at the lazy replicas especially for the OLAP applications which require the real-time reporting for operational data.

In-database replication: The replication log generator and sender are tightly embedded inside the DBMS engine (D2.1) instead of relying on an external application-driven replicator like ETL tool or middleware-based database replication that may involve an additional network round-trip to replicate from one database to another.

Figure 2:
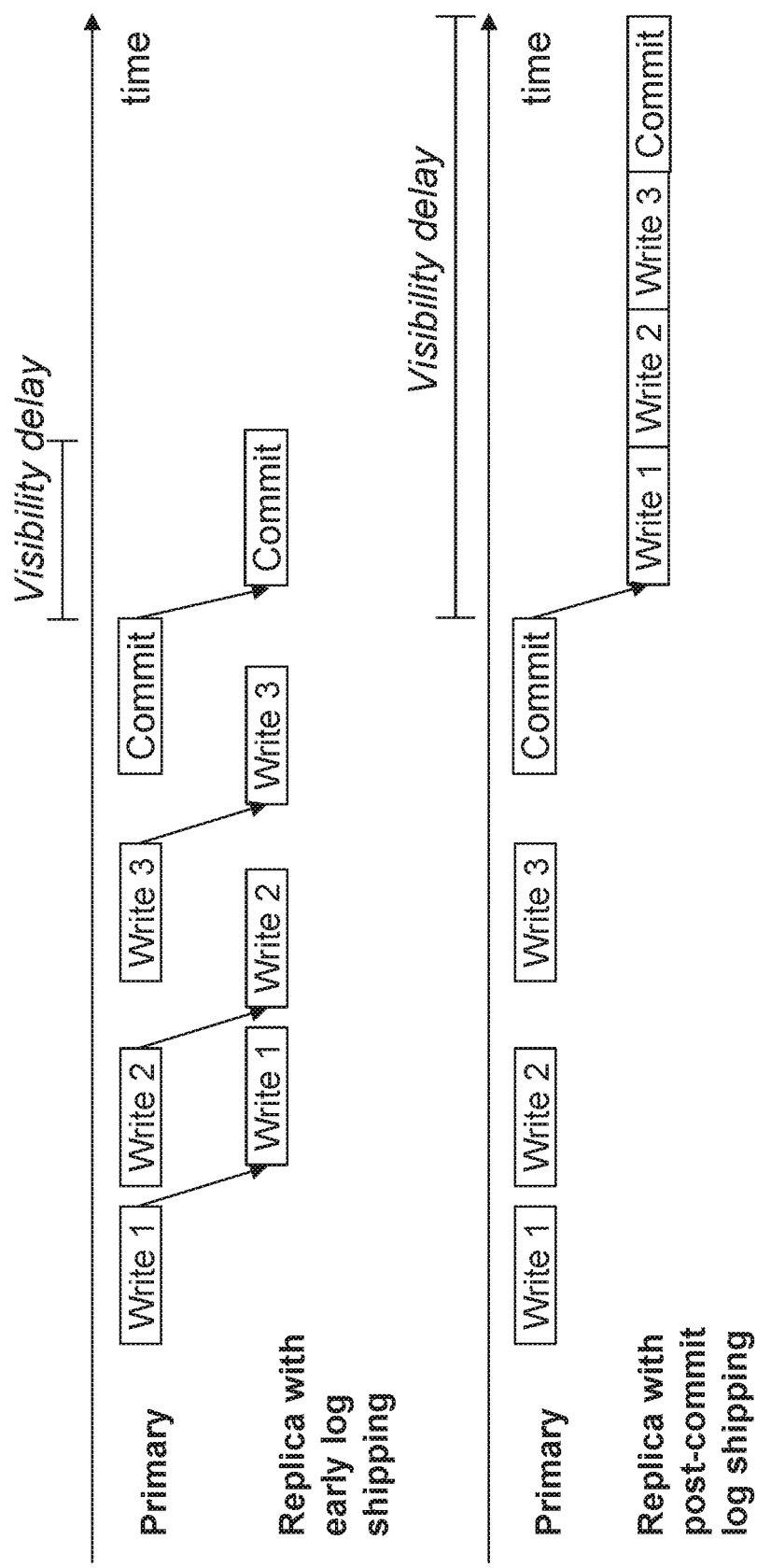
FIG. 2 shows an example of early log shipping versus post-commit log shipping, according to some embodiments.

Early log shipping: ATR may ship the generated replication log entry early, as soon as a corresponding data manipulation language (DML) statement is completed (D2.3) even before the transaction is completed. As illustrated in FIG. 2, this early log shipping scheme 200 may help with reducing the visibility delay of multi-statement transactions. Under the early log shipping, if the primary transaction is aborted later, then the replica changes made by the replication log entries should be rolled back as well. However, compared to database systems employing optimistic concurrency control, a database management system may show relatively lower abort ratios to the extent that it may rely on pessimistic write locks for concurrency control among the write transactions, in some embodiments; in other embodiments, read queries may not require any lock based on MVCC implementation.

Parallel log replay: ATR may perform parallel log replay in replicas to reduce visibility delay (D3.1). In some embodiments using shared-memory multi-processor architectures, the replication log entries may be generated from multiple CPU cores at the primary. Therefore, without the parallel log replayer, the replicas may not catch up with the log generation speed of the primary, which may eventually lead to increased visibility delay. To achieve full parallelism during the log replay, a lock-free parallel log replay scheme is disclosed herein and further explained in Section 3.

Fifth, together with the above approaches for reducing the visibility delay, ATR allows users to specify the maximum acceptable staleness requirements of individual queries by using a query hint like "select . . . with result lag (x seconds)" (D3.2). When a commit log is generated at the primary, the current time is stored in the commit log entry which is propagated to the replicas. Additionally, at the replica side, when the commit log is replayed, the stored primary commit time is recorded as the last commit-replay time. Based on the last commit-replay time maintained at the replica and the staleness requirement specified in the executed query, it may be determined whether or not the query refers to a database snapshot that is too old. If the query does refer to a database snapshot that is too old, then the query may be automatically re-routed to the primary in order to meet the given visibility requirements. While the primary is idle, a dummy transaction may be periodically created and propagated to replicas to maintain the last commit-replay time more up-to-date.

Sixth, additional design considerations may be employed to implement a lighter-weight log replayer to reduce CPU consumption of the replayer transactions (D3.3). If the replayer transactions repeat the same amount of work as the primary write transaction, then the same amount of CPU resource may be needed to replay the write transaction. However, ATR may reduce the CPU consumption of the replayer transactions by the following design decisions.

- To find the target record at the replica for a given replication log entry, ATR log replayer may perform a hash operation with the 8-byte RVID, instead of involving the primary key search operation or any other predicate evaluation. Further benefits may also result from record-level result logging (D2.1).
- ATR log replayer skips locking and unlocking operations based on its lock-free parallel log replay scheme (D3.1). More detail is explained in Section 3.3 and Section 3.4.
- ATR log replayer may skip constraint checks that may have already been done at the primary. More detail is explained in Section 3.5.1.
- ATR log replayer also performs light-weight commit operations, which is explained in Section 3.5.2.

Such saved CPU resources at the replicas may eventually lead to more capacity for more OLAP workloads at the replicas.

Seventh and finally, as a consequence of lazy replication, if a failure is involved during replication, a number of replication log entries may be lost before they are successfully applied to replicas. In order to deal with this situation, ATR supports a post-failure replica recovery leveraging the characteristics of in-memory column store (D3.4), which is explained in Section 4.1.

Figure 19:
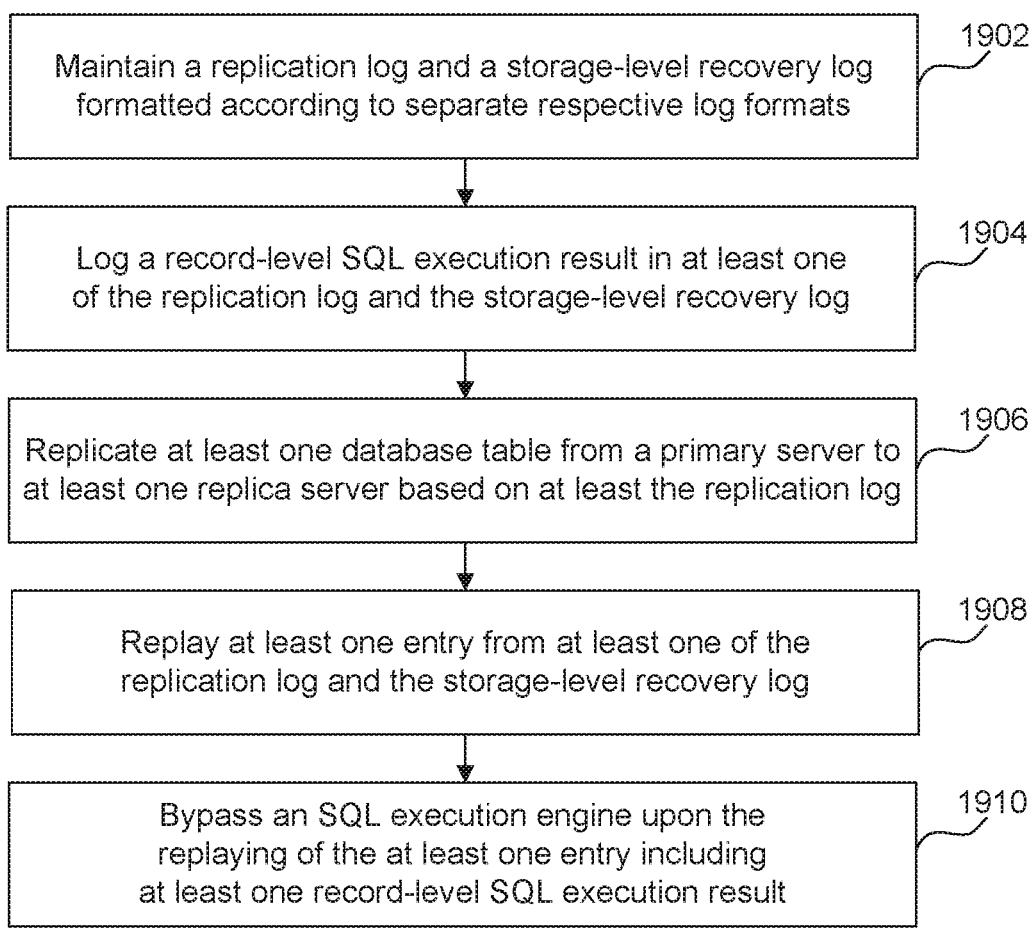
FIG. 19 shows a flowchart of an example replication method for parallel replication of databases across row-store and column-store table formats, according to some embodiments.

An example embodiment can be seen in the flowchart of FIG. 19, which illustrates replication method 1900 for parallel replication of databases across row-store and column-store table formats, according to some embodiments. Replication method 1900 may be performed by processing logic that may include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order from that shown in FIG. 19, as will be understood by a person of ordinary skill in the art.

Replication method 1900 shall be described with reference to FIGS. 1 and 19. However, replication method 1900 is not limited to that example embodiment.

In 1902, a replication log and a storage-level recovery log may be maintained such that each is formatted according to separate respective log formats, for example. In some embodiments, the logs may be configured so that at least one of the logs is in a different format from any of the other logs. Different embodiments may vary how tightly coupled the storage-level recovery log may be with respect to the physical format of a target table type (e.g., row-store table format with differential logging, etc.). By such maintaining, new logs may be created as necessary, or existing logs may be preserved, stored, backed up, or otherwise saved, for active use, standby use, or archival, to name a few non-limiting examples.

In 1904, a record-level SQL execution result may be logged in at least one of the replication log and the storage-level recovery log, for example. By such logging, information may be written or otherwise stored or saved to at least one of the maintained logs, such as in the form of an entry that may be later sent or replayed, such as by a sender or a replayer, respectively, in some embodiments. The logging may include any level of detail as may be necessary or desired for a given implementation or configuration, as may be specified by an implementer, developer, or user, for example. The level of detail for the logging may be more or less than what may be originally used with a corresponding transaction, query, operation, or other corresponding event to be logged, in some embodiments.

In 1906, at least one database table may be replicated from a primary server to at least one replica server, for example. In some embodiments, this replicating may be performed based on at least the replication log. Other factors may influence the nature and manner of replication. Replication may be initiated by sending data and/or logs, such as via a network interconnect, bus, or other communications interface or communication infrastructure. In some embodiments, the primary server and at least one replica server may be each configured to store data according to one table format of a row-store table format and a column-store table format. Additionally, in some embodiments, the primary server's table format is different from the at least one replica server's table format, for example.

In 1908, at least one entry from at least one of the replication log and the storage-level recovery log may be replayed or played back, in some embodiments. This action may be performed by, for example, replay or playback of logged events, results, or other equivalent means. This step may be performed or directed by any of the servers involved in the replication process (e.g., primary or any replica), for example. In some embodiments, at least one entry may include a record-level SQL execution result, for example.

In 1910, upon the replaying of 1908, an SQL execution engine may be bypassed upon replaying at least one entry that may include at least one record-level SQL execution result, in some embodiments. For example, with reference to FIG. 1, any or each of primary 120 and any replicas 140 may each have its own SQL execution engine, such as in SQL processor 122 or 142, in this example embodiment. However, because a log entry replayed may include a record-level SQL execution result, some overhead, latency, and any resultant uncertainty may thereby be avoided. Further, in other example embodiments, other replication may be performed in parallel, quickly, and across different table formats. Other advantages of this novel approach would thus be understood by persons of ordinary skill in the art.

Replication method 1900 is disclosed in the order shown above in this exemplary embodiment of FIG. 19. In practice, however, the operations disclosed above, alongside other operations, may be executed sequentially in any order, or they may alternatively be executed concurrently, with more than one operation being performed simultaneously, or any combination of the above.

3 Log Generation and Replay

After describing the structure of the replication log entries (Section 3.1), this section presents how they are generated by the primary server (Section 3.2) and then replayed by the replica server in parallel (Section 3.3).

3.1 Log Records

Each replication log entry may have the following common fields.

- Log type: Indicates whether an entry is a DML log entry or a transaction log entry. The transaction log may be again classified into a pre-commit log entry, a commit log entry, or an abort log entry.
- Transaction ID: Identifier of the transaction that may write the log entry. This may be used to ensure the atomicity of replayed operations in the same transaction.
- Session ID: Identifier of the session to which the log generator transaction is bound. Transactions may be executed in order within the same session sharing the same context. Session ID is used to more efficiently distribute the replication log entries to the parallel log replayers, which is explained in more detail in Section 3.3.

In particular, the DML log entries have the following additional fields.

- Operation type: Indicates whether a log entry corresponds to an insert, update, or delete log entry.
- Table ID: Identifier of the database table to which the write operation is applied.
- Before-update RVID: Identifier of the database record to which the write operation is applied. In some embodiments employing MVCC, even when a part of a record is updated, a new record version is created instead of overwriting the existing database record. Whenever a new record version is created, a new RVID value, which is unique within the belonging table, may be assigned to the created record version. In some embodiments, where the RVID may have 8 bytes of length, its increment operation may be efficiently implemented by an atomic CAS (compare-and-swap) instruction without requiring any lock or latch, depending on system architecture. Insert log entries may not require Before-update RVID, in some embodiments.
- After-update RVID: While Before-update RVID is used to quickly locate the target database record at replica, After-update RVID may be applied to keep the RVID values identical across the primary and the replicas for the same record version. Then, on the next DML log replay for the record, the record version may be found again by using the Before-update RVID of the DML log entry. For this, RVID fields of the replica-side record versions may not be determined by the replica itself but filled by After-update RVID of the replayed log entries. Delete log entries may not require their own After-update RVID(s), in some embodiments.
- Data: Concatenation of the pairs of the changed column ID and its new value. Column values may have a neutral format that may be applied to either of a row store or a column store so that, for example, a DML log entry generated from a row store table may be consumed by the corresponding column store table replica.

3.2 Log Generation

Figure 3:
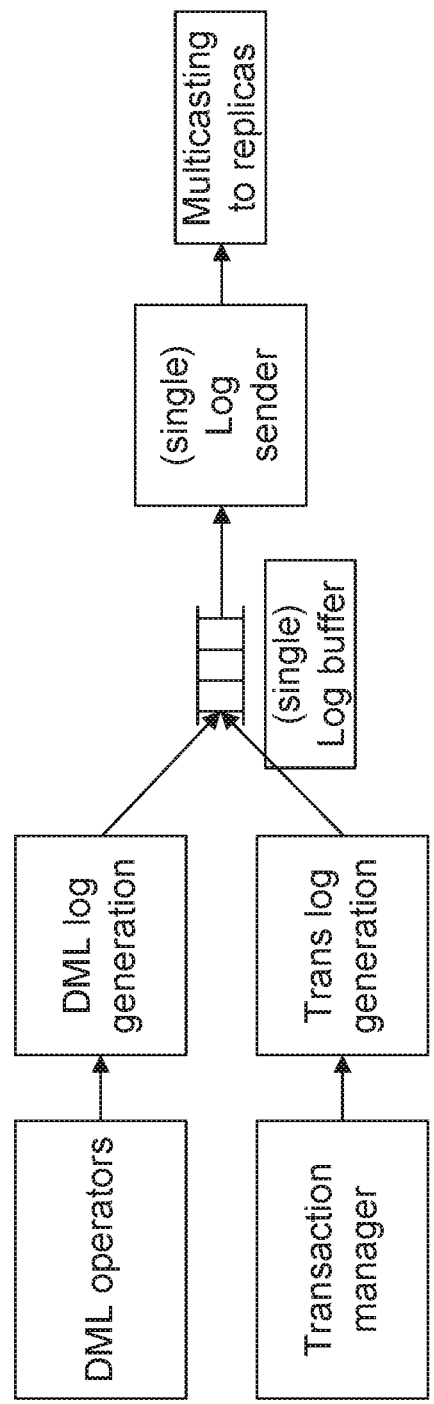
FIG. 3 shows an example of a log generator and sender, according to some embodiments.

FIG. 3 shows the architecture of the replication log generator and replication log sender 300. After a DML statement is successfully executed, the corresponding DML log entries may be generated from the record-level change results together with their Before-update RVID and After-update RVID values. The generated DML log entries may be directly appended to a shared log buffer without waiting for the completion of the transaction. There may exist multiple threads which are trying to append to the single shared log buffer, but, the log buffer may be efficiently implemented by a lock-free structure using an atomic CAS instruction.

The transaction log entries may be generated after the corresponding transaction's commit or abort is decided, but before their acquired transaction locks are released. Such generated transaction log entries may be also appended to the same log buffer as DML log entries. Together with the single log sender thread which may multicast the appended log entries to the corresponding replicas in order, it may be concluded that the generated replication log entries may be ordered into a single log stream in the log buffer and delivered to each of the replicas, ensuring the following properties.

- The transaction log entries may be placed after their preceding DML log entries in the replication log stream.
- A later committed transaction's commit log is placed after its earlier committed transaction's commit log in the replication log stream.

Multicast operations may be implemented in some embodiments by using repeated network send calls to different target hosts. Additionally or alternatively, faster network-level multicast operations may also be used.

3.3 Parallel Log Replay

ATR parallel log replayer may, in some embodiments, be implemented so as to parallelize the DML log replay while performing the transaction commit log replay in the same order with the primary. In such embodiments, in order to reduce unnecessary conflict and to reduce the visibility delay, novel concepts of SessionID-based log dispatch methods and RVID-based dynamic detection of serialization error are described herein.

Figure 4:
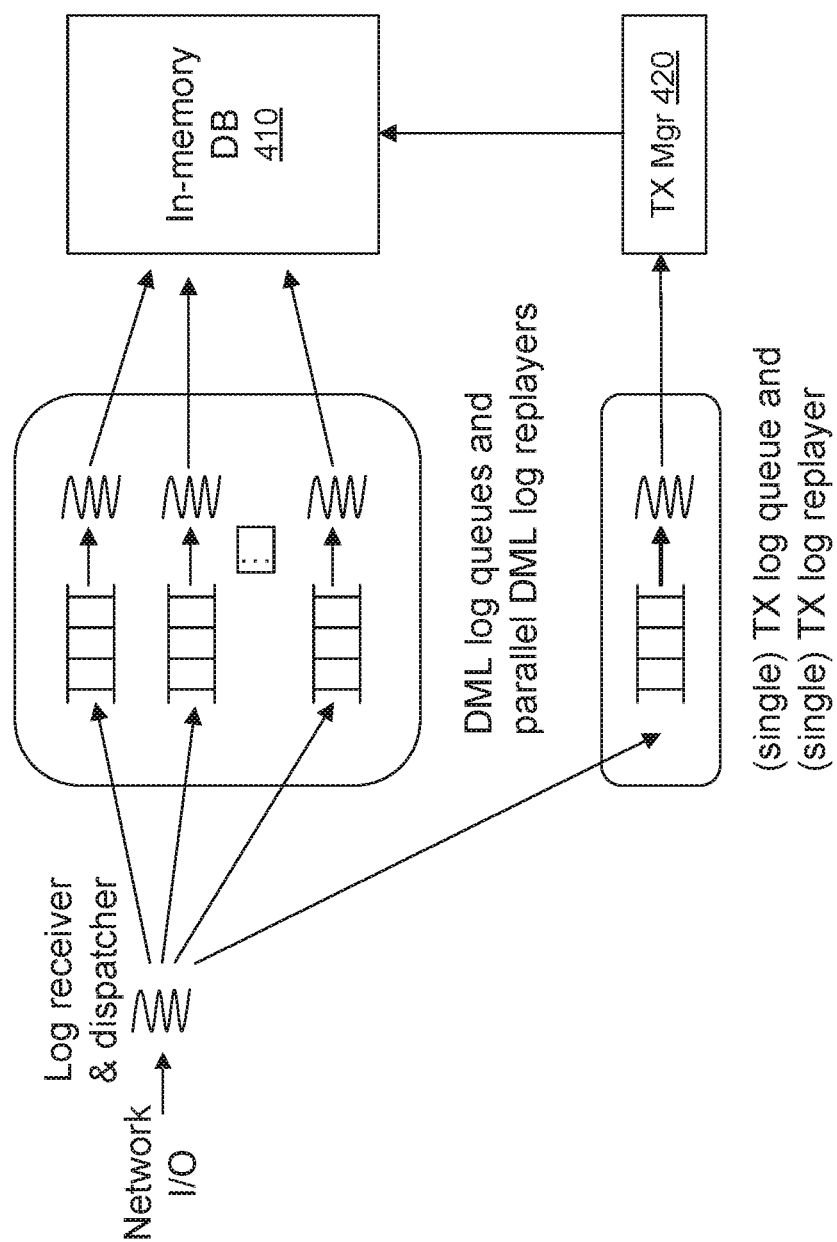
FIG. 4 shows an example of a parallel log replay, according to some embodiments.

As illustrated in FIG. 4, after receiving a chunk of replication log entries for in-memory database 410, the log dispatcher of ATR system 400 may dispatch the received log entries depending on their log type. If the encountered log entry is a commit log, then it is dispatched to the global transaction log queue. If the encountered log entry is a DML log, a pre-commit log, or an abort log entry, then it may be dispatched to one of DML log queues by the modulo operation with Session ID stored in the log entry, as may be implemented by transaction manager 420, according to some embodiments. Since a transaction (TX) is bound to a single session, log entries generated from the same transaction are dispatched to the same DML log queue. For the session which may repeatedly access the same set of database objects with different transactions, the SessionID-based log dispatch method may reduce unnecessary conflict among the parallel replayers than a plain TransactionID-based dispatch method. In some embodiments, TableID-based dispatch methods may limit parallelism for the skewed update workloads to a particular table. In some embodiments, SessionID-based dispatch method(s) may be combined with dynamic adjustment method(s) for better load balancing across the available queues, such as by monitoring the length of each queue.

The log entries distributed to multiple queues are dequeued and replayed by the log replayer dedicated to each log queue. The replay algorithm for each log type is presented in Algorithms 1 to 4. The trickiest part in the log replay algorithm is how to ensure replaying DML log entries in their generation order on the same database records while replaying the transactions in parallel by multiple DML log replayers. For example, in case of some parallel log replay algorithms, the transaction replay order may be determined by using a central run-time inter-transaction dependency tracker which may subsequently become a global contention point. Unlike this pessimistic approach, ATR may, in some embodiments, not maintain a run-time inter-transaction dependency graph nor an additional lock table, but may instead follow an optimistic lock-free protocol. After finding the target database record for the log replay, the ATR replayer checks whether or not the database change happened already before the current log entry is applied. If not, then such a case would be called a log serialization error, and the log replay may then be retried with re-reading the target database record (lines 9 to 15 and 17 to 23 in Algorithm 1).

Figure 5:
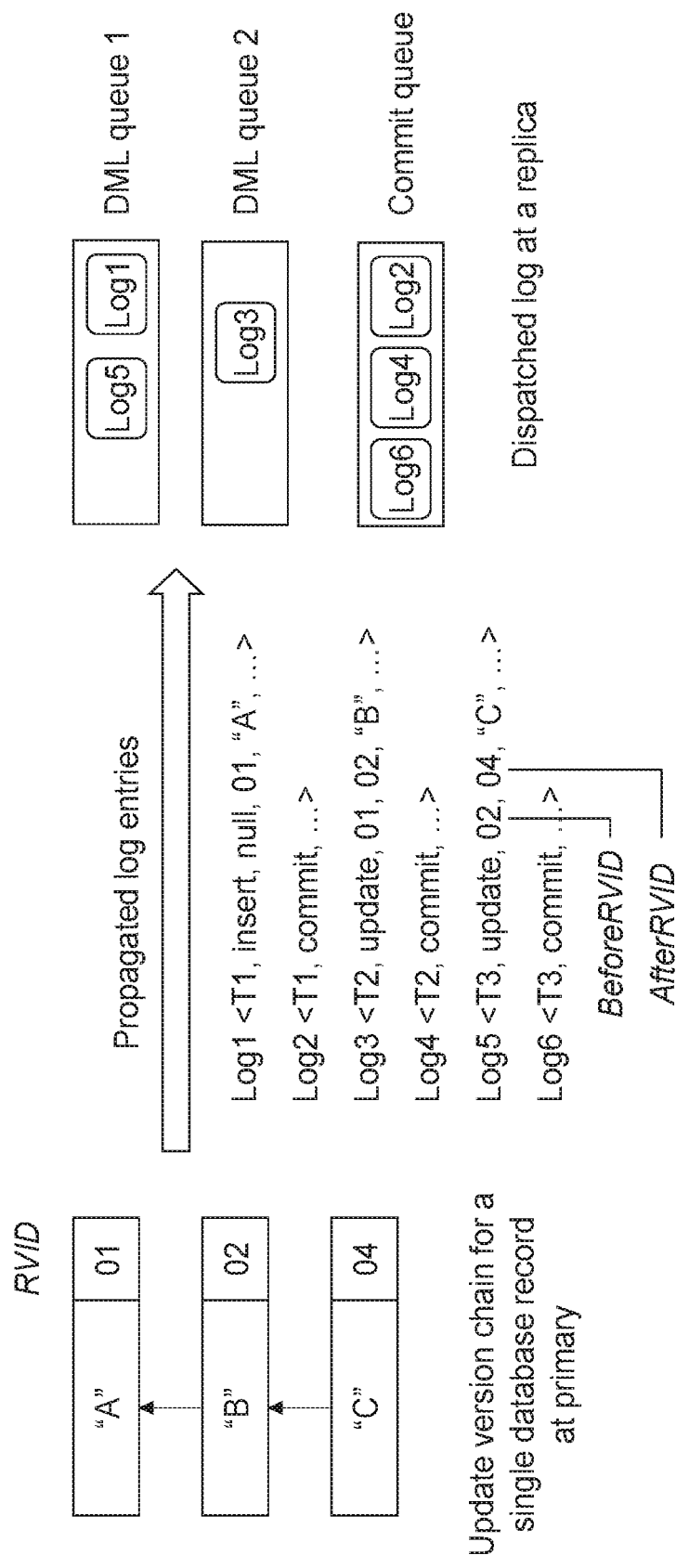
FIG. 5 shows another example of a parallel log replay, according to some embodiments.

In order to detect the log serialization error, ATR may make use of characteristics of MVCC implementations in some embodiments. The update and delete log entries check whether there exists a record version whose RVID equals to Before-update RVID. If such a record version may not yet be visible to the replaying transaction (that is, when R is empty in line 12 or line 20 of Algorithm 1), it means that the preceding DML operation for the same record has not yet been replayed. For example, assuming that there are three transactions which have inserted or updated the same database record in order, as illustrated in scenario 500 of FIG. 5 ($T_1$ inserted, $T_2$ updated, and then $T_3$ updated the same record). Then, the version space at the primary and the corresponding log entries may be populated as in FIG. 5. Under this scenario, after replaying log entries $L_1$ and $L_2$, $L_5$ may be encountered by a DML replayer before $L_3$ is replayed. However, while trying to replay $L_5$, the DML replayer recognizes that there is no record version whose RVID is equals to $L_5$'s Before-update RVID (in this example, 02, as shown in FIG. 5), and thus, it may encounter the log serialization error and retry the DML replay operation (after some idle time, if necessary).

By this proposed RVID-based dynamic detection of serialization error, the DML log entries may be dispatched and replayed to multiple queues freely without restriction (for example, without TableID-based dispatch). For at least this reason, ATR may significantly accelerate the log replay and thus reduce the visibility delay between the primary and the replicas, in some embodiments.

Some example embodiments of DML replay algorithms may be implemented according to the following pseudocode samples. However, in other embodiments, similar DML replay schemes can be implemented according to other code, pseudocode, or algorithms.

---

Algorithm 1 Replay a DML log entry
($\alpha$, $\beta$, and $\tau$ denote After-update RVID,
Before-update RVID, and TableID, respectively.)

---

Require: A DML log entry L.
1:    Find the transaction object T for L.TransactionID.
2:    if T is empty then
3:        Create a transaction object for L.TransactionID.
4:    end if
5:    if L.OperationType = Insert then
6:        Insert L.Data into the table L.$\tau$.
7:        Set the inserted record's RVID as L.$\alpha$.
8:    else if L.OperationType = Delete then
9:        while true do
10:          Find the record version R whose RVID equals
11:        to L.$\beta$ in the table L.$\tau$.
12:          if R is not empty then
13:            Delete R. return
14:          end if
15:        end while
16:    else if L.OperationType = Update then
17:        while true do
18:          Find the record version R whose RVID equals
19:        to L.$\beta$ in the table L.$\tau$.
20:          if R is not empty then

---

Algorithm 1 Replay a DML log entry
($\alpha$, $\beta$, and $\tau$ denote After-update RVID,
Before-update RVID, and TableID, respectively.)

---

21:            Update R with L.Data and L.$\alpha$. return
22:          end if
23:        end while
24:    end if

---

Algorithm 2 Replay a precommit log entry
Require: A precommit log entry L.

---

1: Find the transaction object T for L.TransactionID.
2: Mark T's state as precommitted.

---

Algorithm 3 Replay a commit log entry
Require: A commit log entry L.

---

1: Find the transaction object T for L.TransactionID.
2: Wait until T's state becomes precommitted.
3: Increment the transaction commit timestamp of the replica server by marking T's generated record versions with a new commit timestamp value.

---

Algorithm 4 Replay an abort log entry
Require: An abort log entry L.

---

1: Find the transaction object T for L.TransactionID.
2: Abort T with undoing the changes made by the transaction T.

---

3.4 Optimistic Interleaving for High-Conflict Workloads

By the parallel log replay scheme explained in Section 3.3, DML log entries may be replayed in parallel without having any central run-time inter-transaction dependency tracker that may otherwise be a potential contention point. However, the scheme itself may not need to parallelize transactions that update the same database record at the primary. For example, if replayer transactions follow the two-phase locking protocol, then the log entry $L_3$ may be replayed only after $T_1$ may finally commit and release its acquired record lock in the scenario of FIG. 5. In order to overcome such a parallelism limitation under high-conflict workloads, in some embodiments, a so-called optimistic interleaving scheme may be combined with the parallel log replay scheme proposed in Section 3.3.

This optimistic interleaving scheme consists of two parts: one part may handle write-write collisions, and the other part may handle read-write collisions. Regarding the write-write collision, unlike a locking protocol, the DML replay operation may not acquire a record lock. This may be made possible because there is no other concurrent write transaction in the replica except the other DML log replayers, and the transaction serialization may be ensured by checking the RVID visibility among the DML log replayers as explained in Section 3.3. Regarding the read-write collision, when the DML replayer may read the RVID value of the target database record at replica, the DML replayer may directly read any not-yet-committed changes instead of following the read-committed semantics. Replay transactions, in some embodiments, may follow the read-committed semantics of the snapshot isolation. As a result, even though they do not acquire any record locks, lines 10 and 18 of Algorithm 1 may have to wait until the preceding DML operation's transaction finally commits. On the other hand, in some other embodiments, lines 10 and 18 may immediately read the RVID values of not-yet-committed changes instead of following the conventional read-committed semantics. RVID value may be updated at the last step of the DML replay operation.

Figure 6:
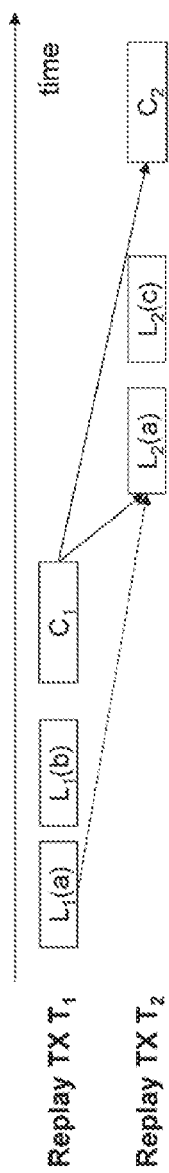
FIG. 6 shows an example of a replay of two inter-conflicting transactions, according to some embodiments. $L_i(\alpha)$ denotes a data manipulation language (DML) log entry for a database record $\alpha$ which may be replayed by transaction $T_i$. $C_i$ denotes the commit log entry of transaction $T_i$. The arrows denote the inter-operation dependency implicitly imposed by the given replay algorithm.
Figure 6:
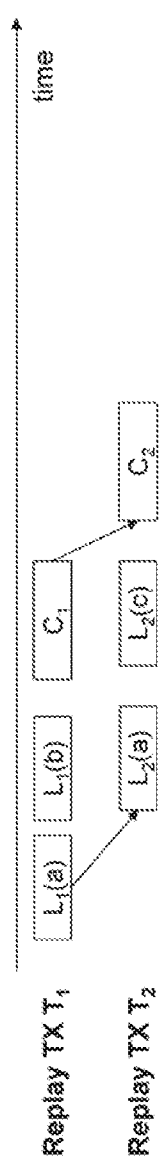

Optimistic interleaving may bring an added benefit of further increasing parallelism of replayed transactions even for high-conflict workloads, such as in comparison 600 of FIG. 6, which illustrates the benefit of this optimistic interleaving implementation. In the one timeline, (a), $L_2(a)$ may start its replay operation after waiting for $C_1$'s replay operation. On the other hand, in another timeline, (b), using the enhanced techniques described herein, $L_2(\alpha)$ may start right after waiting for $L_1(\alpha)$. In FIG. 6, ordering between $C_1$ and $C_2$ may be preserved by the single commit replay queue, as explained in Section 3.3. In addition to the benefit of increased parallelism for high-conflict workloads, optimistic interleaving also helps reduce the CPU cost of each replay transaction since replayer transactions skip record lock and unlock operations. The benefit of optimistic interleaving is also shown experimentally in Section 6.4.

Optimistic interleaving may preserve data consistency at the replica tables because (1) for the same database record, DML operations may still be replayed in their initial execution order at the primary system (by the RVID-based parallel log replay scheme), and thus the record versions may be created in their initial execution order; (2) the commit log replay is performed in the same order as the primary based on single commit log queue even for the inter-conflicting transactions; (3) following MVCC, each DML replay creates its own record versions which become visible only when the replay transaction finally commits; and (4) the to-be-aborted replay transaction may not affect any log serialization dependency at the replicas because any After-update RVID value of an aborted transaction may not be referred to as a Before-update RVID value of the next executed write transaction at the primary side.

3.5 Further Improvements and Implementation Details 3.5.1 DML Replay with Skipped Constraint Checks In Algorithm 1, the DML replay operation may skip the integrity constraint check because it was already done at the primary. Due to the skipped integrity check and the skipped locking during parallel log replay, it is possible that uncommitted duplicate records that have the same unique key values may co-exist tentatively (for example, when a record at the primary is inserted, deleted and then inserted again by transactions $T_1$, $T_2$, and $T_3$, replaying their DML log entries in the order of $T_1$, $T_3$, and $T_2$ at a replica may lead to such a situation). However, this may not lead to any real problem because the result of DML replay may not be directly visible to the queries executed at the replica but visible only after the corresponding commit replay is completed and also because the commit log entries may be replayed strictly in the same order as the primary.

3.5.2 Light-Weight Commit Replay

Another aspect of the techniques disclosed herein for improving performance is to avoid letting the implementation of the commit log replay become a bottleneck point in the ATR parallel log replay scheme. This may be realized, in some embodiments, by breaking down the transaction commit work into three parts: pre-commit, commit, and post-commit, and then delegate the pre-commit work to the parallel DML log replayers by using the pre-commit log entry and may delegate the post-commit work to asynchronous background threads. As a result, the serialized part of the transaction commit operation may be made short and light-weight.

The pre-commit log entry may play the role of marking that DML log entries of the transaction have been successfully replayed and of informing the commit log replayer by using the transaction state information maintained in the transaction object, as shown in Algorithm 2. The role of the commit log replay is to mark the generated record versions by the transaction's DML replay as committed and thus to make the record versions visible to the queries executed at the replica server, as shown in Algorithm 3. Right after finishing the commit operation of a commit log entry, the commit log replayer may process the next commit log entry in the queue while delegating the remaining post-commit work of the transaction to other background threads.

3.5.3 MVCC at Replicas

The insert (line 6), delete (line 13) and update (line 21) operations in Algorithm 1 create their own records versions instead of performing in-place updates. The record versions created by the same transaction are associated as a group by pointing to the same so-called TransContext object. At the time of replaying its transaction commit operation (Algorithm 3), the commit timestamp value is determined for the committing transaction, and the value is written to the TransContext object. Then, the commit timestamp value becomes immediately visible to related record versions of the committing transaction.

The garbage collection at replicas may be performed independently of the primary's garbage collection because a single query may not be allowed to accesses both of the primary and its replica during its execution. Also, because a single query may not be allowed to access multiple replicas of the same table during its execution, the garbage collection operations of the replicas do not need to synchronize with each other. Replicas may follow the same MVCC protocol as the primary, in some embodiments.

3.5.4 Query Processing at Replicas

Queries running at the replicas may follow visibility rules of MVCC. When a query starts at a replica, it takes its snapshot timestamp (or read timestamp) from the replica commit timestamp which is incremented by the commit log replayer as in Algorithm 3. Then, during its query processing, the query judges which record versions should be visible to itself by comparing the record versions' creation timestamp values with the query's snapshot timestamp.

3.5.5 Handling DDL Operations

Following a distributed system architecture, the replica server may not maintain its own metadata persistency but may cache the needed metadata entities on demand by reading from the primary. Therefore, if a DDL transaction is executed at the primary, this execution may not generate a separate DDL log entry but may instead invalidate the corresponding metadata entities at the replicas, according to some embodiments. This invalidation operation may be performed at the time when the DDL transaction is committed after waiting until its preceding DML log entries for the table are replayed.

4 Replica Recovery 4.1 Log-Less Replica Recovery

By the nature of the lazy replication, if a failure is involved during log propagation or log replay, a series of replication log entries may be lost before they are successfully applied to the replica database. In order to deal with this problem, one approach under the lazy replication may be a so-called store-and-forward method. The generated log entries may be stored persistently within the primary transaction boundary and then propagated to the replicas lazily. Then, by maintaining a watermark at the replayer side, the lost log entries may be easily identified and resent from the persistent store. In some embodiments, a store-and-forward approach may be used. However, replica recovery methods that do not rely on the persistent replication log store may further improve efficiency, in order to reduce overhead of the primary transaction execution and make replica recovery protocols easier to implement.

One aspect of this approach is to detect the discrepancy between the primary table and its replica table by comparing the RVID columns of the two tables, as presented in Algorithm 5. Two sets of the RVID values may be collected from the latest record versions of the primary and the corresponding replica tables. And then, depending on the result of the relative complements of the two sets, the database records existing only in the primary table are re-inserted to the replica and the records existing only in the replica table are deleted.

---
Algorithm 5 Recover a replica table
Require: P, a set of RVID values from the primary table.
Require: R, a set of RVID values from the replica table.

1: Delete the records R \ P from the replica.
2: Insert the records P \ R into the replica

---

Figure 7:
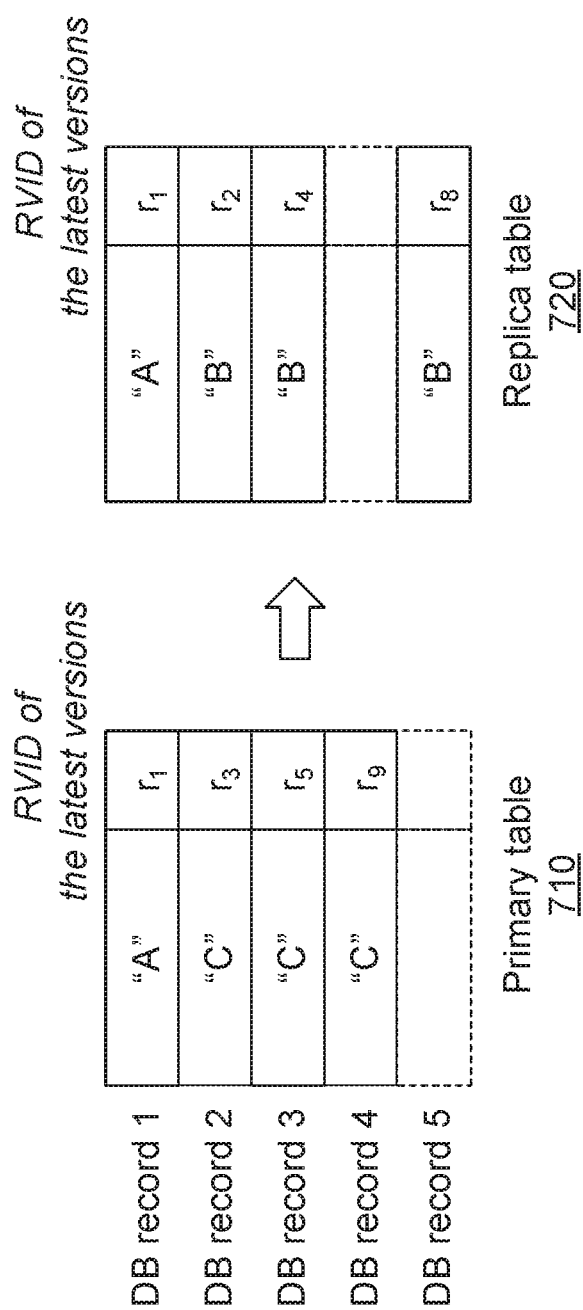
FIG. 7 shows an example of a post-failure replica recovery, according to some embodiments.

In the example tables 700 of FIG. 7, $P=\{r_1, r_3, r_5, r_9\}$ is collected from the primary table 710 and $R=\{r_1, r_2, r_4, r_8\}$ from the replica table 720. Then, since $R \backslash P=\{r_2, r_4, r_8\}$ and $P \backslash R=\{r_3, r_5, r_9\}$, the replica records matching with $\{r_2, r_4, r_8\}$ are deleted, and the primary records matching with $\{r_3, r_5, r_9\}$ are re-inserted to the replica.

Comparison of two RVID columns is implemented by a merge-join-style algorithm where two RVID columns may be compared after being collected from each table in a sorted order. Because the RVID column values of the entire table may be stored on a contiguous memory in a compressed form in a column store, scanning the entire RVID column values of a column store table may be done rapidly. Moreover, the column scan performance may be further accelerated by exploiting SIMD-based vectorization and parallelization.

4.2 Redo and Undo Logging at Replicas for Recovery and Transaction Abort

During the DML log replay, the recovery redo log entries may be generated for the recovery of the replica server. They are asynchronously flushed to the persistent log storage, and the commit replay may not wait for the log flush completion because the lost write transactions on any failure at a replica may be re-collected from the primary database as explained in Section 4.1. The undo log entries may also be generated during the DML log replay because the not-yet-committed replication log entries may be replayed for early log shipping, as explained in Section 2.2. When a transaction is aborted after its replication log entries were already shipped to any of its replicas, then its abort log entry may be generated and shipped. At the replica side, the change made by the transaction's DML replay may be rolled back as in Algorithm 4.

4.3 Adaptive Query Routing for Handling Replica Errors

When a particular replica becomes unavailable due to crash or run-time error such as an out-of-memory exception, it is desirable to continue the overall query service without disrupting or throwing errors to the end users. For this, ATR may incorporate an adaptive query routing scheme which may include the following query routing rules.

If a replica-side query encounters an error, then the query is implicitly aborted and retries. And, if it turns out that the replica may not be available after checking the process status or after waiting for a predefined time period, then the query is retried with being forwarded to the primary or another available replica. Because the forwarding mechanism may happen automatically and implicitly by the client library, this type of error may not need to be handled at the application or user side.

If a replica is marked as unavailable, then the replica status may also be reported to the primary and entered as metadata. Then, the next incoming queries may exclude the replica during their query compilations until the replica is marked as available again.

5 Handling Additional Transaction Consistency Issues

This section addresses three particular transaction consistency issues arising from the nature of lazy replication architecture and practical ways of dealing with them.

5.1 Ensuring Transactional Consistency Among Multiple Replicas with Wait-and-Forward Scheme When a table may have more than one replica, it may be desirable to ensure transactional consistency among multiple replicas of the same table. One solution is to perform an atomic multi-node commit operation, such as a two-phase commit, for the replayer transaction of the multiple replicas in order to keep the replicas in the same database state. However, it may not be a desirable approach in terms of the replay performance because each commit log replay may involve a cross-node synchronization overhead. To avoid this overhead, a so-called wait-and-forward scheme for ensuring transactional consistency across multiple replicas of the same table may be used, in some embodiments. In this wait-and-forward scheme, each replica commits independently from each other but may apply the following special query routing rules:

First, the query plan generator may not allow a single query to access more than one replica of the same table in its generated query plan. That is, a single query may access at most only one replica for a given table during its query execution.

Second, each database session may maintain the last commit-replay timestamp of the last accessed replica node in the session and stores it as the last snapshot timestamp of the session. And then, when a newly accessed replica node has an older commit-replay timestamp than the last snapshot timestamp of the current session, then the query execution at the replica node is postponed until the last commit-replay timestamp of the replica node becomes equivalent to or higher than the last snapshot timestamp of the session. If the waiting time at the replica becomes larger than a predefined time threshold, the query may be automatically forwarded to the primary node or other available replica nodes.

Figure 8:
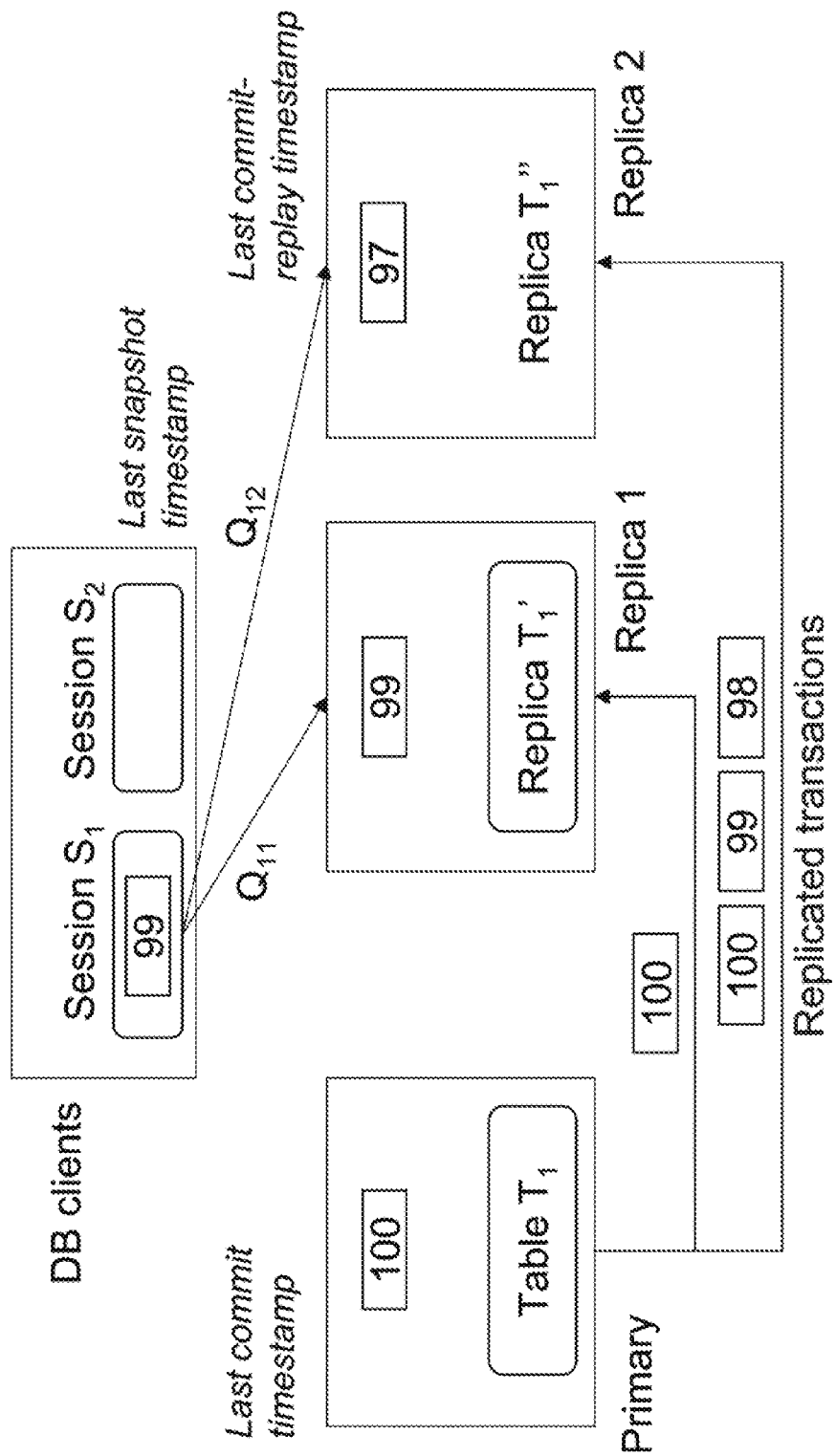
FIG. 8 shows an example of a multi-replica replication scenario, according to some embodiments.

In the example scenario 800 of FIG. 8, a database session $S_1$ may execute two queries $Q_{11}$ and $Q_{12}$ in order. After executing $Q_{11}$ at replica 1, $S_1$ caches 99 as its last snapshot timestamp. And then, when executing $Q_{12}$ at replica 2, it may be detected that the replica 2 has an older database state than its last executed replica by comparing its last snapshot timestamp (99) with replica 2's last commit-replay timestamp (97). Then, $Q_{12}$'s execution is postponed until replica 2 gets a sufficiently high last commit-replay timestamp.

In the wait-and-forward scheme, read queries that are executed in a database session established for a particular replica may not need to involve waiting or forwarding.

5.2 Ensuring Read-Your-Writes Consistency for Read Queries in a Write Transaction If a transaction tries to read its own earlier DML result and the read operation is routed to the replica, then the replica-routed query may not see its own change result yet. This corresponds to a so-called read-your-writes consistency. In order to guarantee the read-your-writes consistency with ATR, the primary may maintain additional watermarks incremented on every DML, and then the replica-routed query checks whether the sufficient number of DML logs are already replayed at the replica. Additionally or alternatively, each database session may maintain the changed table list for the currently active transaction and may then directly route such detected read-your-writes queries to the primary, which may improve ease of implementation. In the example timeline 900 of FIG. 9, $R_1(\alpha)$ may be routed to the primary.

Figure 9:
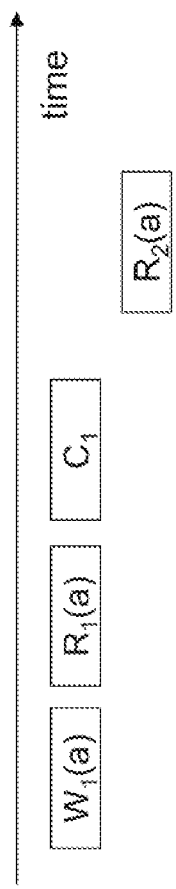
FIG. 9 shows an example of a read-your-writes implementation, according to some embodiments. $W_i(\alpha)$ denotes a write operation for a database object $\alpha$ by transaction $T_i$. $R_i(\alpha)$ denotes a read operation for a database object $\alpha$ by transaction $T_i$. $C_i$ denotes the commit operation of transaction $T_i$.

Read-your-writes consistency issue may arise for already committed changes. In the example of FIG. 9, if $W_1(\alpha)$ or $C_1$ may not yet be replayed at a replica, a replica-routed query $R_2(\alpha)$ is unable to see the latest updated result of the same session at the replica yet. The read-your-writes consistency for already committed changes may be ensured by extending the wait-and-forward scheme of Section 5.1. When a transaction makes changes at the primary, the transaction's primary commit timestamp may also be stored as the last snapshot timestamp of the session. Then, in the example of FIG. 9, $R_2(\alpha)$ may be executed after waiting until $C_1$ is replayed at the replica.

5.3 Ensuring Monotonic Read Consistency for Consecutive Read Queries

Let's say that a database session performs two read queries in order where the first one is routed to the primary but the second one to a replica. In this scenario, some database state that was visible to the first query may not be visible to the second replica-routed query by the nature of the lazy replication of ATR—this may correspond to so-called monotonic read consistency.

The monotonic read consistency for repeated read queries in a database session may also be achieved by further extending the wait-and-forward scheme of Section 5.1. When a query is executed at the primary, the query's snapshot timestamp value is stored as the last snapshot timestamp of the session and then compares it with the replica's last-replay timestamp value on the next query execution in the session.

6 Experiments

In this section, with the following experiment goals, the following performance metrics of ATR were evaluated in some embodiments:

The optimistic parallel log replay scheme of ATR shows superior multi-core scalability over the primary-side transaction processing or another pessimistic parallel log replay scheme which relies on a run-time inter-transaction dependency tracker (Section 6.2).

Based on its optimistic parallel log replay, ATR shows sub-second visibility delay in the given update-intensive benchmark (Section 6.3).

Regardless of transaction conflict ratio, ATR log replayer constantly shows higher throughput than the primary or a pessimistic algorithm (Section 6.4).

The proposed optimistic interleaving contributes higher parallelism under high contention situation (Section 6.4).

The overhead of ATR at the primary may not be significant in terms of primary-side write transaction throughput and CPU consumption (Section 6.5).

ATR log replayer consumes fewer CPU resources than the primary-side transaction processing for the same amount of workloads, which results in higher capacity for OLAP workloads at the replicas (Section 6.5).

Finally, with the increasing number of replicas, ATR shows scalable OLAP performance without notable overhead to the OLTP side (Section 6.6).

6.1 Experimental Setup

The ATR log replayer may be implemented, in some embodiments, to be switchable between the optimistic parallel replayer and another pessimistic parallel log replayer. For purposes of conducting experiments to measure performance, embodiments of ATR with optimistic parallel replayer may be compared with embodiments of ATR with pessimistic parallel log replayer.

To generate a OLTP and OLAP mixed workload for a benchmark, a benchmark program may run both TPCC and TPC-H workloads simultaneously over the same data set, after initially populating 100 warehouses. Whenever a transaction starts, each client may randomly choose its warehouse ID from the populated 100 warehouses. Depending on the purpose of the experiments in this section, a subset of the TPC-CH benchmark may be sufficient. This is explained in more detail in the next subsections. The tables used in the TPC-CH benchmark may be defined as in-memory column store tables. Absolute numbers for the TPC-CH benchmark may not be disclosed but normalized by undisclosed constants, except for the micro-benchmark results conducted in Section 6.4 and Section 6.5.

For this particular benchmark, up to six independent machines may be connected to each other via the same network switch. Each machine has four 10 Gbit NICs may be bound to a single logical channel aggregating the network bandwidth up to 40 Gbit/sec. Each machine has 1 TB of main memory, 60 physical CPU cores (120 logical cores with simultaneous multithreading), and local SSD devices for storing recovery logs and checkpoint files. In the experiment of Section 6.6, up to four replica servers may be deployed with one primary server and one client machine, while the other experiments may focus on single-replica configuration.

6.2 Multi-Core Scalability with Parallel Log Replay

To see multi-core scalability of the ATR parallel log replayer, ATR log entries may be generated from the primary while running TPC-C benchmark for one minute of the warm-up phase and five minutes of the high-load phase. Then, after loading the pre-generated ATR log entries into main memory of a replica, the elapsed time for the ATR log replayer to process the pre-generated and pre-loaded log entries may be measured, varying the number of replayer threads at the replica. To compare the log replay throughput of the replica with the log generation throughput of the primary, TPC-C throughput at the primary may also be measured, also varying the number of TPC-C clients.

Figure 10:
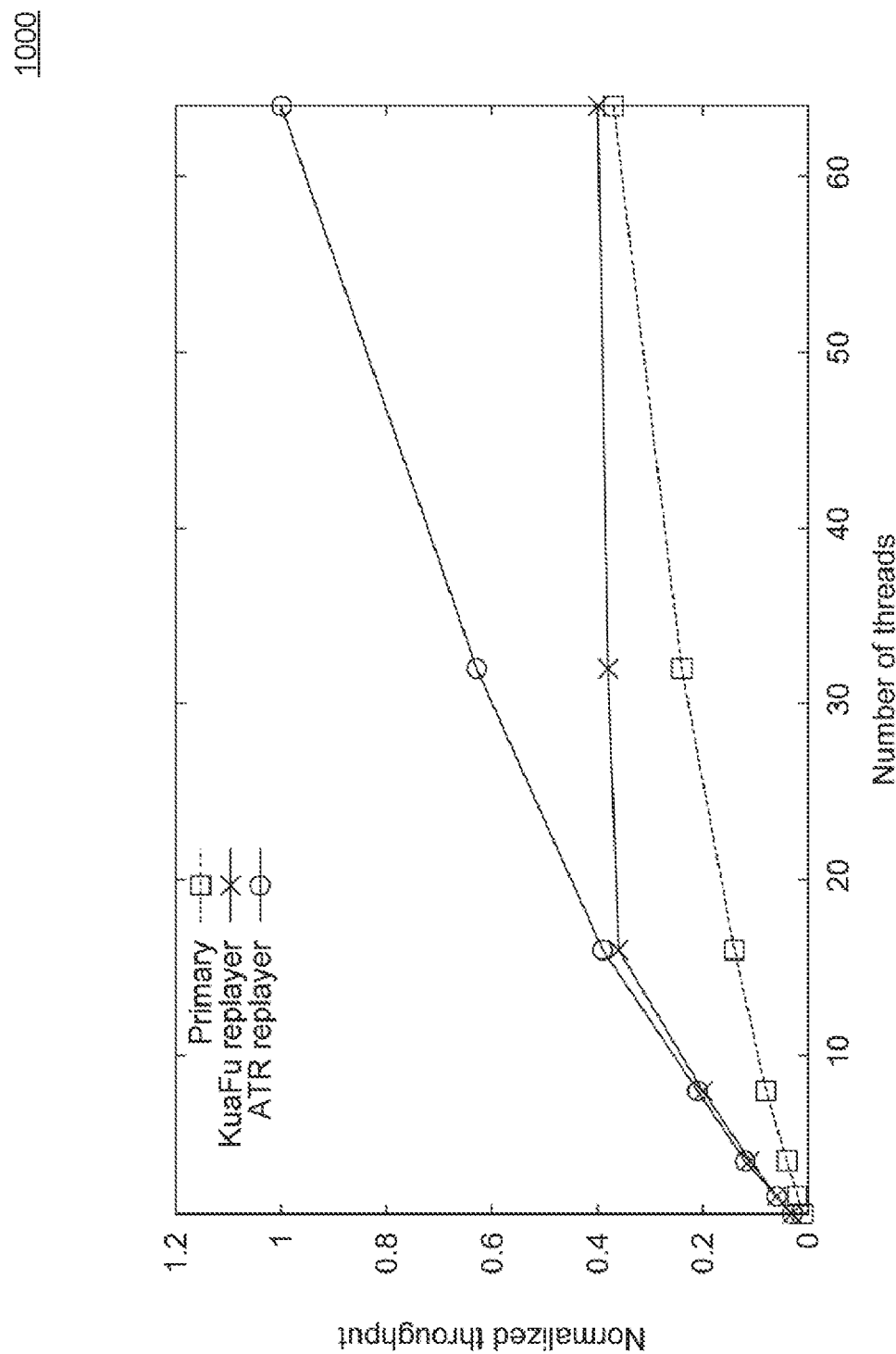
FIG. 10 shows an example of TPC-C throughput over the number of threads (normalized by the 64-thread ATR replayer throughput), according to some embodiments.

Normalized throughput graph 1000 of FIG. 10 shows the experimental results. The normalized throughput was calculated by dividing the number of transactions included in the pre-generated log by the elapsed time, and then normalized by the 64-thread ATR replayer throughput. ATR showed scalable throughput with the increasing number of replayer threads and constantly higher throughput than the primary transaction throughput. This means that the log received from the primary may be processed at the replica without any queuing delay.

Furthermore, the optimistic parallel log replay algorithm of ATR may be compared with a pessimistic parallel replay algorithm that relies on an inter-transaction runtime dependency tracker. At the primary side, the generated log entries may be accumulated until the transaction's commit time (as explained in FIG. 2), assuming that log entries generated from the same transaction may appear consecutively in the log stream. A so-called barrier may play the role of synchronizing the parallel log replayers to provide a consistent database snapshot to the replica queries.

The experiment result with the KuaFu implementation is included in FIG. 10. The KuaFu-style replayer also showed higher throughput than the primary but its throughput was saturated when the number of replayer threads is higher than 16. According to our profiling analysis, the critical section used in the global inter-transaction dependency tracker turned out to be a dominant bottleneck point as the number of the replayer threads increases. In some embodiments, log replay throughput under a TPC-C-like workload may be saturated at 16 CPU cores given costs associated with inter-CPU-socket locks. Compared to typical pessimistic parallel replayers, ATR may not require a global dependency tracker, which may become a single point of contention. Accordingly, ATR shows better multi-core scalability and may thus outperform other approaches when handling heavier workloads at the primary.

6.3 Visibility Delay

To determine whether ATR may achieve real-time replication with the proposed optimistic parallel log replay algorithm under the early log shipping protocol, the commit-to-commit visibility delay may be measured at the replica side. While running the TPC-C benchmark at the primary side, the replayer may periodically measures average visibility delay every 10 seconds. After synchronizing the machine clocks between the primary and the replica, the replayer may calculate the visibility delay by subtracting the primary transaction commit time recorded in the replayed commit log entry from the current time at the time of the commit log replay. This visibility delay measurement method may also be used when employing the adaptive query routing based on its acceptable staleness range, as described in Section 2. Visibility delay may also be measured with different number of concurrent TPC-C connections to see the impact of the volume of the primary transaction workloads. The number of replayers may be dynamically configured to be the same number as the number of TPC-C clients, in some embodiments.

Figure 11:
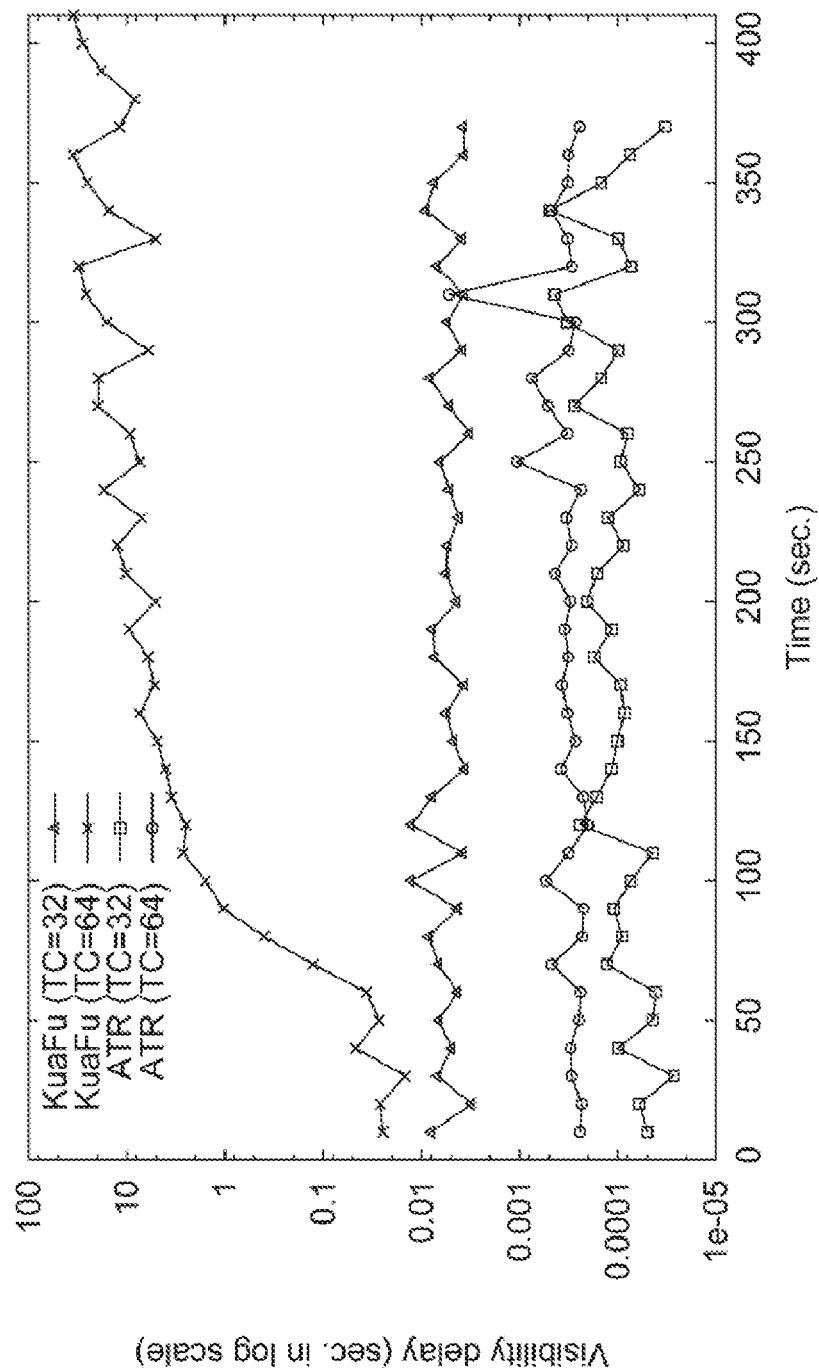
FIG. 11 shows an example of visibility delay at the replica in log scale while running TPC-C benchmark at the primary server (TC denotes the number of TPC-C clients), according to some embodiments.

Visibility delay chart 1100 of FIG. 11 shows the result. When the ATR parallel log replayer is used, the visibility delay is maintained mostly under 1 millisecond over time regardless of the volume of concurrent TPC-C workloads at the primary. On the other hand, the KuaFu-style parallel log replayer shows higher visibility delay and, especially when the number of concurrent TPC-C workloads increases to 64 to see the impact of more update-intensive workload, the length of the log replayer queue started growing up and eventually ended up with high visibility delay (more than 10 seconds) due to the performance mismatch between the primary log generation and the replica log replay, as also indicated by FIG. 10.

6.4 Impact of Inter-Transaction Conflict

To see whether the superior throughput of ATR over the primary is sustained regardless of the inter-transaction conflict ratio, the log replay throughput may be measured, varying the conflict ratio. To emulate the conflict ratio, the ORDERLINE table may be chosen here from the TPC-CH benchmark, and may let 100 clients concurrently run update transactions on top of the table while varying the initial table size from 1000 to one million records. Consistently with the other experiments, the number of replayers is configured to be the same as the number of the primary-side clients, which is 100 in this case. Each update transaction may be committed after repeating the following update statement 10 times.

UPDATE ORDERLINE SET OL_DELIVERY_D=? WHERE OL_W_ID=? and OL_D_ID=? and OL_O_ID=?;

The 10 primary keys used for each transaction are picked up randomly from the key range of the initially populated data and then assigned in a monotonic order within the transaction to avoid any unnecessary deadlock. In the ORDERLINE table, OL_W_ID, OL_D_ID, and OL_O_ID may include an instance of the primary key. This single-table micro-benchmark may be used to generate more severe inter-transaction conflict situation since the performance variation may not be notable when varying the conflict ratio by changing the number of warehouses in the original TPC-CH benchmark.

Figure 12:
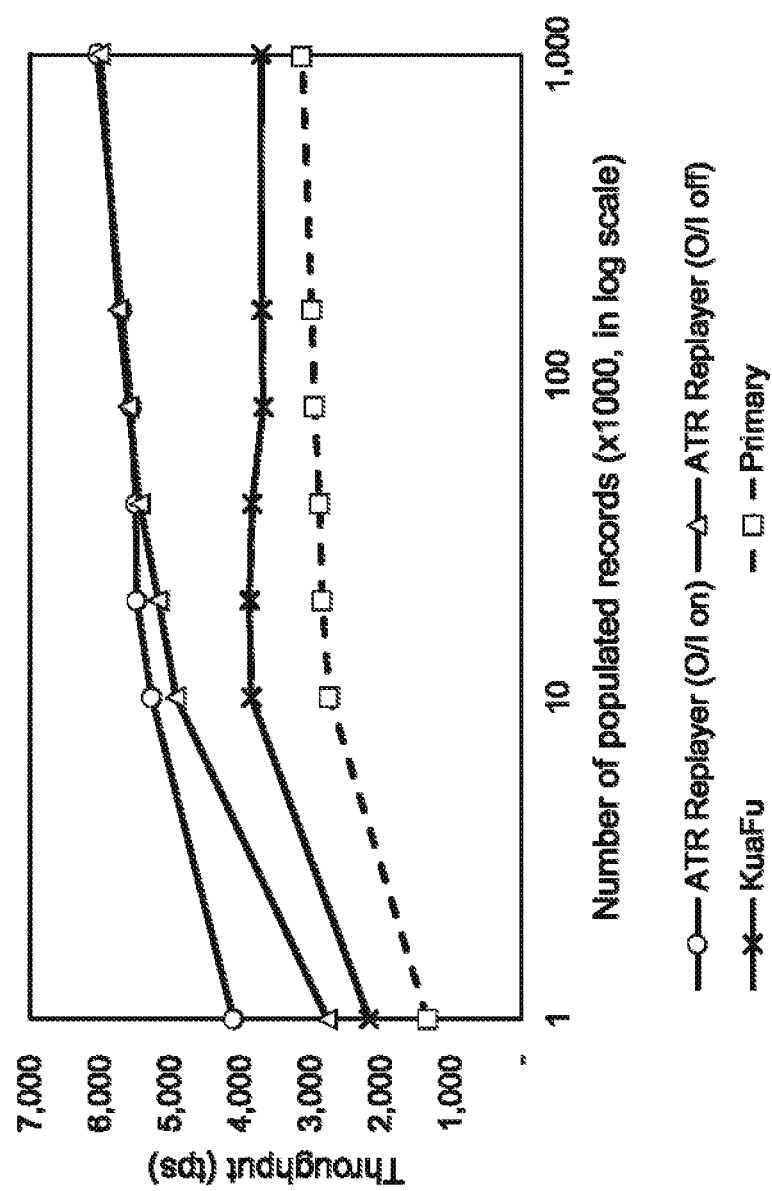
FIG. 12 shows an example of micro-benchmark throughput over the conflict ratio (O/I denotes Optimistic Interleaving), according to some embodiments.

Throughput graph 1200 of FIG. 12 shows the experimental results. ATR constantly shows higher throughput than the primary or our KuaFu implementation regardless of the conflict ratio. In addition, to see the benefit of the optimistic interleaving, the throughput of the ATR replayer may additionally be measured, turning off the optimistic interleaving. The result here shows that the proposed optimistic interleaving may bring a notable gain as the conflict ratio gets higher (for example, when the populated table size is less than 40K records).

In FIG. 12, compared to FIG. 10, the gap between the ATR replayer and the primary is smaller since FIG. 10 was measured with the TPC-C benchmark consisting of read/write workloads while FIG. 12 was measured with the write-only micro-benchmark. Because the write statements may be propagated to the replica without necessarily including other statements, the replica in the TPC-C benchmark may handle fewer replay workloads compared to the designed write-only micro-benchmark.

6.5 Replication Overhead

To evaluate the overhead incurred by ATR at the primary side, the primary transaction throughput may be measured while replicating the generated log entries to its replica. To highlight the overhead, the same update-only single-table micro-benchmark may be run as explained in Section 6.4 while populating 1 million records initially with 40 clients and 40 ATR replayers. Also, differently from Section 6.4 where the replayers run with the pre-generated replication log, the actual performance may be measured with the log replicated from the primary online.

Table 2 shows the result. When the replication is turned off, the primary processed 3046 transactions per second while showing 25.76% CPU consumption at the primary. When the replication is turned on, the primary processed 2948 transactions per second while showing 26.19% CPU consumption at primary. It means that the primary throughput dropped by only 3.2% with ATR enablement. The CPU consumption at the primary increased by 1.6% (the third column in the table) or by 5.0% in terms of the normalized CPU consumption by the throughput (the fifth column in the table). According to our CPU profiling analysis, the additional CPU consumption was mainly contributed to by replication log generation, log buffer management, and network operations, as expected. Note, however, that most of the replication operations at the primary (except the log generation itself) are executed asynchronously by background threads without delaying the primary transaction execution, and thus the impact to the primary transaction throughput is negligible.

TABLE 2

Micro-benchmark throughput and CPU consumption of each site.

|  | Primary throughput (tps) | Primary CPU (%) | Replica CPU (%) | Primary CPU normalized by throughput | Replica CPU normalized by throughput |
|---|---|---|---|---|---|
| Repl. Off | 3046 | 25.76 | N/A | 8.46 | N/A |
| Repl. On | 2948 | 26.19 | 15.60 | 8.88 | 5.29 |

In addition to the primary overhead analysis, the replica-side CPU consumption may be measured as in Table 2. The replica showed only 60.6% of CPU consumption compared to the primary-side execution of the same transaction (=15.60/25.76) or 62.5% in terms of the normalized CPU consumption (=5.29/8.46).

Figure 13:
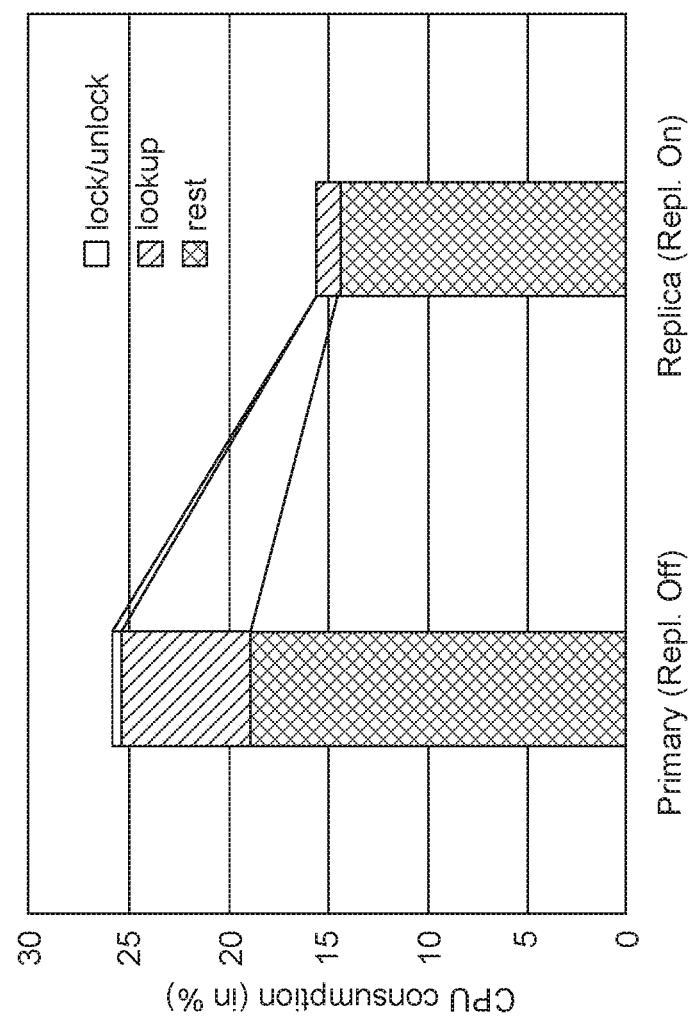
FIG. 13 shows an example of CPU consumption breakdown from the same experiment with Table 2, according to some embodiments.

To explain the low CPU consumption at the replica, CPU consumption of both the primary and the replica(s) may be profiled, as shown in CPU consumption chart 1300 of FIG. 13. According to this CPU profiling analysis, the following three factors contributed to the low CPU consumption at the replica, compared to the CPU consumption at the primary.

"lookup": RVID-based record lookup at the replica may contribute to such CPU cost savings. While the target record at the primary is searched by the primary key value consisting of OL_W_ID, OL_D_ID, and OL_O_ID in this update-only micro-benchmark, the target record at the replica is found by a hash index lookup with the 8-byte Before-update RVID value.

"lock/unlock": The skipped record locking/unlocking during the log replay (Section 3.4) contributed to some extent, albeit small. The gain from the skipped integrity constraint check is not visible in FIG. 13 because this experiment may be performed with the non-key-field update workloads which may not involve any constraint check even at the primary. However, depending on the workload type and the involved integrity constraints at the primary, the CPU cost savings at the replica may be further improved.

"rest": In FIG. 13, the rest of CPU consumption is classified as "rest" may be disregarded for purposes of this example. Nevertheless, beside "lookup" and "lock/unlock," it was observed that the reduced depths of function call stacks during the log replay also contribute to the CPU cost savings in the "rest" part. In addition, the cost relevant to the session management for remote database clients at the primary may be replaced by network channel management at the replica because it is sufficient to handle only the replication log stream.

Such saved CPU resources at the replicas may eventually lead to more capacity for OLAP processing at the replicas, which is shown in more detail in Section 6.6.

6.6 Multi-Replica Scalability Under Mixed OLTP/OLAP Workload

Figure 14:
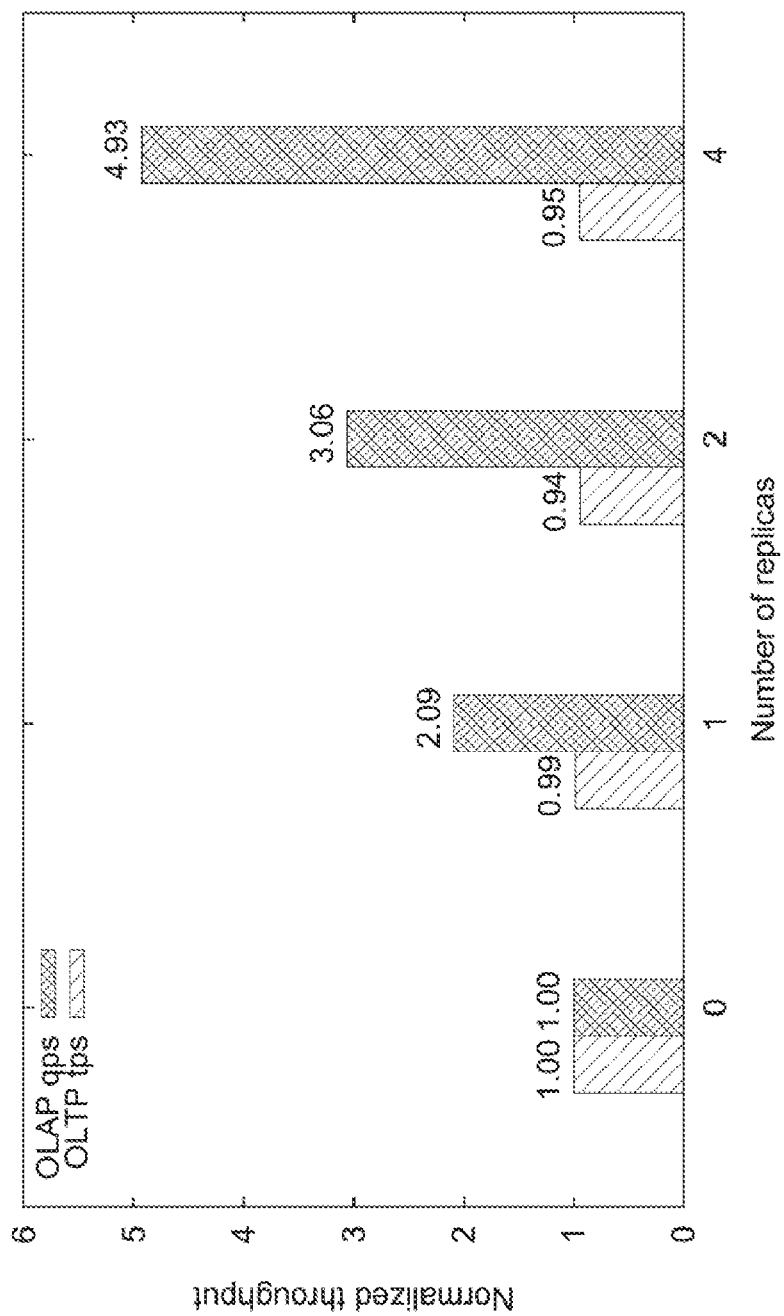
FIG. 14 shows an example of TPC-CH throughput varying the number of the replicas and TPC-H clients (normalized by the 0-replica throughput numbers respectively), according to some embodiments. N-replica configuration means that there are N+1 database servers including the primary.

Finally, performance scalability of OLAP queries under OLTP/OLAP mixed workload by using the TPC-CH benchmark can be seen. Both TPC-C throughput (in terms of transactions per second) and TPC-H throughput (in terms of queries per second) may be measured, varying the number of replicas from 0 to 4. As the number of replicas increases, the number of TPC-H clients may also be increased proportionally, because overall OLAP capacity may increase with the number of replicas. While the number of TPC-C client is fixed to 32, 120 TPCH clients are added per replica server. The number of clients has been chosen so that a single database server may be fully loaded in terms of CPU consumption. Some embodiments may provide so-called intra-statement parallelism for OLAP-style queries, where a single OLAP query execution is parallelized by using multiple available CPU cores at the time of its execution. However, throughout this experiment, the intra-statement parallelism was disabled to see more deterministic behavior with the varying number of TPC-H clients. All the tables in the TPC-CH schema were replicated to available replica servers, while all the TPC-C transactions may be directly routed to the primary while the TPC-H queries may be evenly routed across available database servers including the primary server. As each TPC-H client may communicate with a designated database server, the delay by wait-and-forward, explained in Section 5.1, was not involved in this experiment. Normalized throughput chart 1400 of FIG. 14 shows the normalized throughput of OLTP and OLAP with the different number of replicas. N replicas denote that there are N+1 database servers including the primary. The normalized throughput was calculated by dividing the measured throughput by the throughput without replication. Although the OLTP throughput may decrease slightly with the increasing number of replicas, the OLAP throughput may increase almost linearly. This result confirms that ATR may offer scalable OLAP performance without creating notable performance overhead to OLTP workloads. OLAP throughput may also show super-linear scalability when the number of replicas is 1 or 2, because the replayed transaction may consume less CPU compared to its original execution at the primary by the light-weight log replay mechanism disclosed herein, while the number of TPC-CH clients may be configured so that the system is overloaded. As a result, each replica may have a larger OLAP capacity than the primary in terms of available CPU resources.

7 Eager Parallel Replication 7.1 Implementation

ATR may be extended to perform eager replication so that the primary and its replicas may have the same database state at the time of a query execution. However, under the eager replication, additional performance overhead may be incurred either at the write transaction side (writer-pays-cost approach) or at the replica-executed query side (reader-pays-cost approach).

In the writer-pays-cost approach, the primary write transaction commits after its changes are successfully applied to its replicas and thus the writer transaction's commit processing time may increase. In the reader-pays-cost approach, the read queries coming to the replicas may pay the cost. The primary write transactions commits without waiting for its log application to replicas, following the commit protocol of the lazy replication. However, when a query is dispatched to a replica, it first reads its transaction snapshot timestamp at the primary by making an additional network round trip and then may execute the query processing at the replica after waiting until the replica's last commit-replay timestamp equals to or becomes higher than the transaction snapshot timestamp read at the primary. In this approach, while the writer transaction's commit processing time may not increase, the replica-routed queries' execution time may increase due to the additional network round trip to acquire the primary-side transaction snapshot timestamp. Some embodiments may include offering a reader-pays-cost approach.

Our writer-pays-cost eager replication inherits most of the ATR lazy replication implementation with adjusting its transaction commit protocol so that the primary transaction may be committed only after it is verified that its DML changes may be applied to the replica. With this approach, the eager replication implementation may inherit the benefits of the proposed parallel log replay and the early log shipping mechanisms. Also, by employing the log-less replica recovery mechanism disclosed herein, it is possible to avoid expensive two-phase commit protocols. That is, as the eager replica contents may still be recovered by referring to their primary copies by using the algorithm presented in Section 4.1, the primary write transaction may not need to wait for the redo-logging at the replicas, which may be performed asynchronously in the background. Eager replication may co-exist in the same system with the lazy replication, meaning that some replica for a table may be defined as a lazy replica and another replica for the same table may be defined as an eager replica.

7.2 Experimental Evaluation

Figure 15:
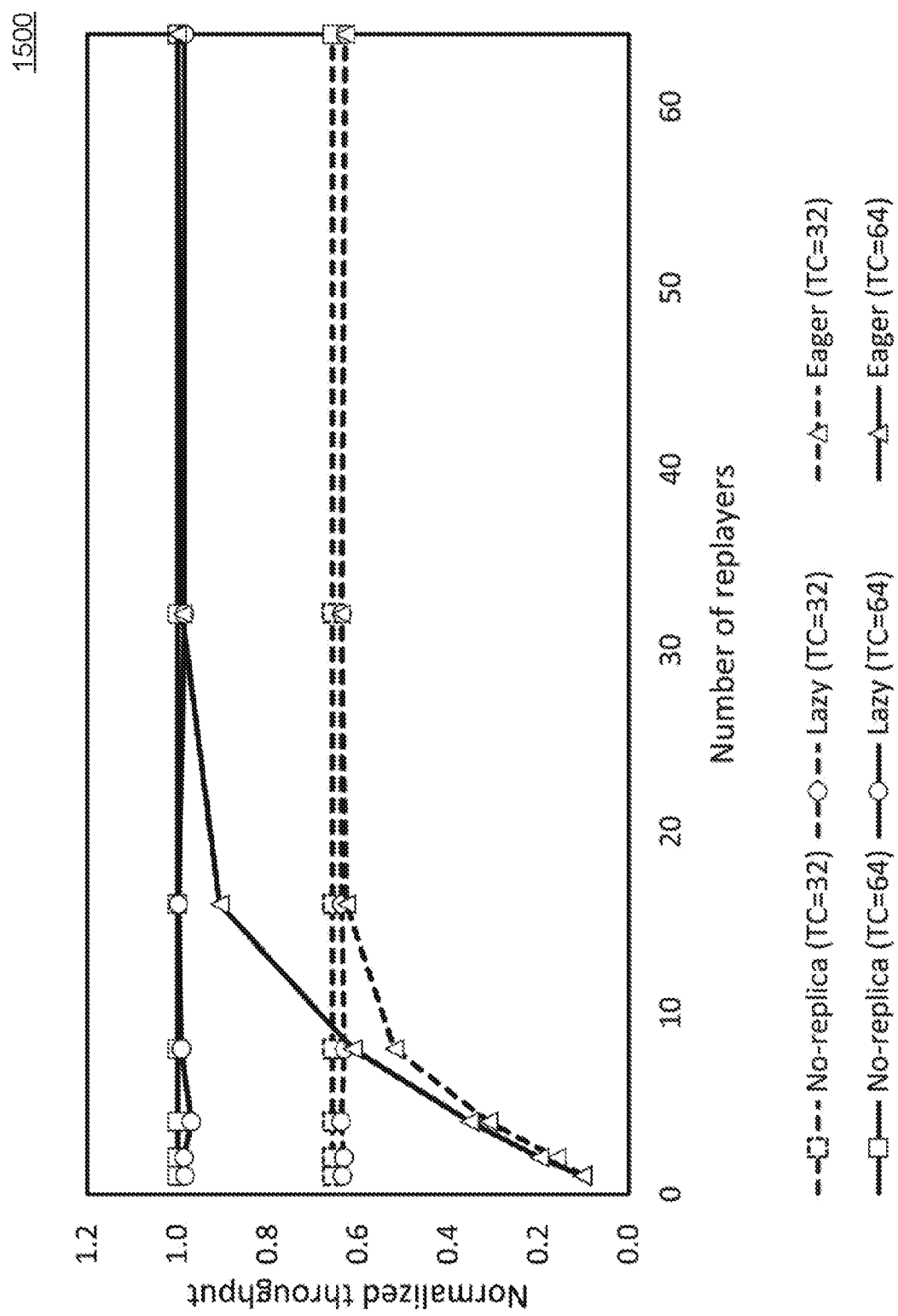
FIG. 15 shows an example of TPC-C throughput varying the number of the replayer threads and TPC-C clients (normalized by the 64-client no-replica throughput number), according to some embodiments.

To demonstrate the impact of the proposed parallel log replay under eager replication, the primary running without any replica (labeled as no-replica), the primary running with a lazy replica (labeled as lazy), and the primary running with a eager replica (labeled as eager), may each be compared in terms of TPC-C transaction throughput, as shown in normalized throughput graph 1500 of FIG. 15. The hardware and client configurations may be identical to the ones described in Section 6.1.

The result shows that the primary transaction throughput may not be affected by the replayer performance under the lazy replication while the primary transaction throughput under the eager replication may significantly drop as the degree of the replayer parallelism decreases. However, when sufficient number of replayer threads is assigned (16 or higher for TC=32; 32 or higher for TC=64), the eager replication may not show any notable performance drop compared to the lazy replication in this example. According to our analysis, the following factors may contribute to improved performance of our eager replication implementation.

- The parallel log replay mechanism disclosed herein may play a role as indicated by FIG. 15. If a replica is not able to catch up with the transaction processing throughput of the primary, then the replication requests may continue to be delayed, and the replica may end up with higher transaction commit time because a transaction may be unable to be committed until its preceding DML operations are fully applied to the replicas.
- The eager log shipping mechanism disclosed herein may be another contribution factor. Since the DML log replay operations become overlapped with the next operations of the same transaction (as illustrated in FIG. 2), the amount of work that may need to be delayed at the time of transaction commit processing may be significantly reduced.
- With the log-less replica recovery mechanism disclosed herein, the implemented eager replication may involve a single network round trip with its eager replica at the time of transaction commit, unlike more expensive two-phase commits.

Figure 16:
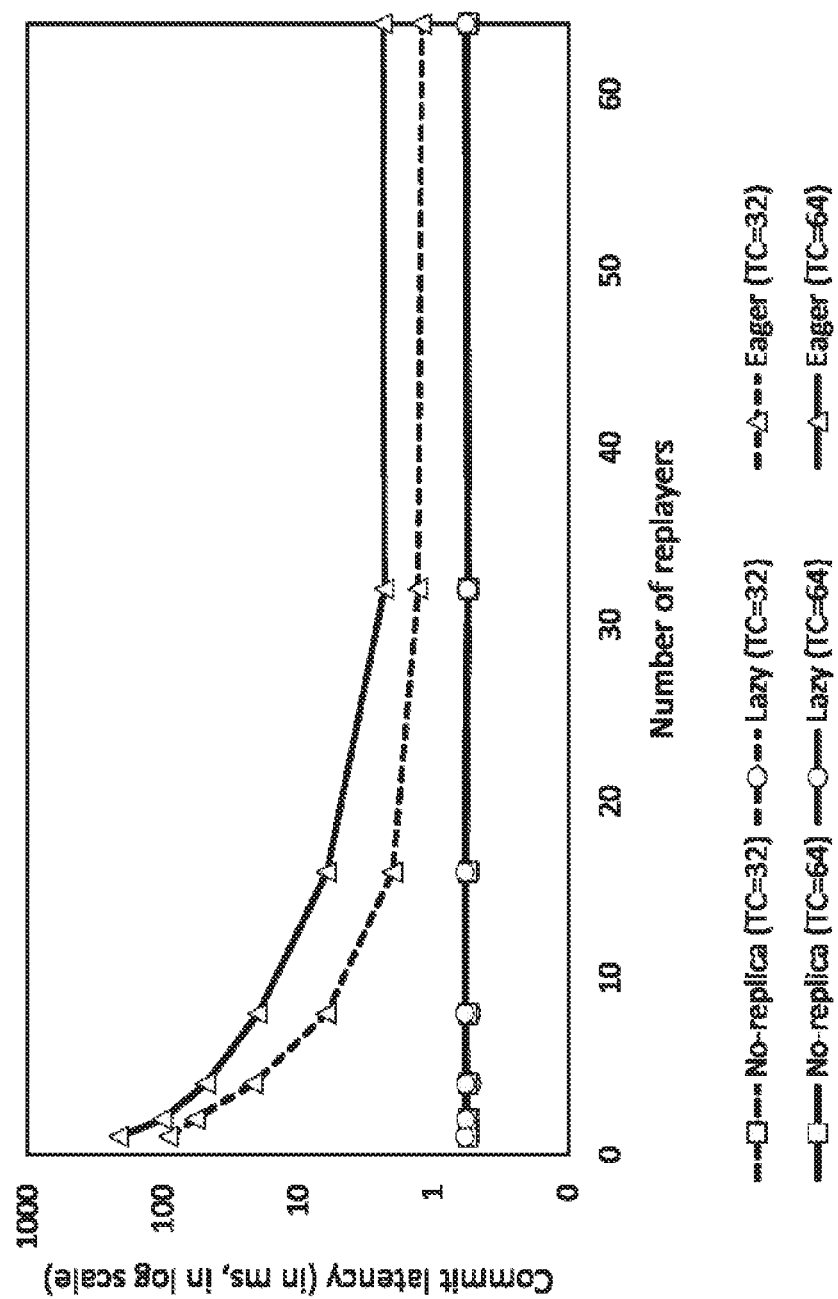
FIG. 16 shows an example of transaction commit latency measured during the same experiment with FIG. 15.

To see the internal behavior of the eager replication, the transaction commit latency may be measured during the same experiment, as shown in commit latency chart 1600 of FIG. 16, displaying the result measured at the client side. With eager replication, individual transaction commit time itself may be significantly increased, compared to lazy replication: for example, 549 μs at no-replica (TC=32), 562 μs at lazy (TC=32), and 1223 μs at eager (TC=32). However, considering that a single transaction in our TPC-C benchmark consists of multiple client-server interactions, where each database query may involve a network round trip between a client and the primary server, such increases at the commit time may not significantly affect the overall transaction processing throughput.

Even though client-server benchmark configurations shown herein are intended to emulate a typical application-to-database configuration in real commercially available database management systems, the increase in commit latency by eager replication may turn into more notable performance drop particularly for the transactions written in stored procedures, which may be executed inside the database engine. In addition, primary transaction performance under eager replication may be affected by the network latency between the primary and its replicas, differently from lazy replication. In order to further reduce the inevitable network delay occurring at the eager replication, using RDMA may be another practical option to use.

8 Additional Features

8.1 Sub-Table Replication

In addition to ATR, which may assume that the entire records and columns of a designated table may be replicated, additional levels of sub-table replication may also be included, such as vertical and horizontal sub-table replication. In vertical sub-table replication, only a few selected columns may be replicated to replicas. In this configuration, replicas may still maintain RVID values which are assigned per record. Using this RVID column, the matching replica records may be uniquely identified. The column filter may be added to the primary side to avoid unnecessarily generating excessive data during ATR log generation. On the other hand, in horizontal sub-table replication, only when the new after-update record image meets a predefined predicate (record filter), the corresponding ATR log entry is generated. In this configuration, the record filter should be applied also when a replica is initialized or recovered. In some embodiments, vertical sub-table replication and the horizontal sub-table replication may be used together for the same table.

8.2 Replication Across Formats

Section 2 and Section 3.1 presented that ATR may be used for replication across the OLTP-favored row store and the OLAP-favored column store based on the ATR's logical representation of the changed data set. By further leveraging the ATR's format-independent expressiveness, additional forms of cross-format replication configurations may be considered as follows:

First, ATR may enable the primary table and its replicas to have different table partitioning schemes. For example, the primary table may be a non-partitioned row-store table, and its replica table may be a range-partitioned column-store table. Then, the incoming OLTP transactions may be processed without the additional partition-pruning overhead, while the OLAP queries may be processed (or parallelized) on its partitioned replica table more efficiently. Moreover, partitions of a replica table may be distributed to multiple nodes to leverage more CPU resources for OLAP queries on the replica table. It may be also considered another form of multi-replica configuration compared to the configuration of having multiple redundant replicas of a primary table.

Second and similarly, ATR may enable the primary table and its replicas to have different set of secondary indexes or different database configuration such as different checkpoint interval or different merge interval from its delta storage to main storage.

Third, replication to a volatile temporary table may be a further configuration option of ATR. With this option, even at a database node that may not necessarily have its own persistent storage volume, a replica of a table may be maintained and used for scalable query processing.

8.3 Write Workload Scalability and Semi-Multi-Master Replication

The replication mechanism discussed so far may be a form of master-slave replication where a single primary server handling the incoming write transactions which are again replicated to the read-only replicas. This configuration of ATR may be beneficial due to the following reasons compared to multi-master replication where each replica may server not only read workloads but also write workloads.

In order to make the replicas execute the write transactions in the same order even against conflicting transactions, the multi-master replication may need to involve a complex consensus protocol or the increased possibility of multi-node deadlocks.

The "scale up" approach rather than the "scale out" approach is selected for a high volume of OLTP workloads. For example, a large-scale ERP customer may run on top of a single hardware host having 16 CPU sockets, for example, in some embodiments.

The "scale out" approach for the OLTP workloads is still an option, but, in this case, careful table placement is needed to avoid the two-phase commit overhead incurred by multi-node write transactions.

Even though ATR may take the master-slave replication architecture due to the above reasons, it may also offer the option of placing the master copies of tables in different database nodes. Still, write transactions for a particular table are directed to a particular database node, but write transactions for another table may be processed in a different database node in order to distribute write workloads to multiple nodes overall. This architecture may be called semi-multi-master replication to distinguish from the plain forms of multi-master or master-slave replication architecture.

In this semi-multi-master replication of ATR, there may be a multi-node deadlock, but it may be automatically detected by using a multi-node deadlock detector. In addition, automatic suggestion of improved table placement for a given workload may also be used in a workload-driven replication suggestion tool, in some embodiments. By utilizing capture-and-replay features, the tool may analyze the captured workload and may find out whether the overall system performance (in terms of query performance, two-phase commit overhead, load balancing, and memory consumption) may be improved with adjusting the primary table location and/or adding replicas to particular tables.

8.4 an Alternative to Handling Log Serialization Error—Log Forwarding with Out-of-Order Log Replay When a log serialization error is encountered, the corresponding DML replayer waits until the log serialization error is resolved, as described with Algorithm 1. Alternatively, it is also possible to forward the waiting-state log entry to a separate waiter queue in order to keep processing the next log entries in the normal DML queue. In this case, if a DML log entry of a transaction is forwarded to a waiter queue and then the next DML log entry of the same transaction is replayed in the original normal DML queue, then the DML operations of the same transaction may be replayed in a different order than their original execution order. However, with the proposed parallel log replay mechanism, this may not lead to any problem, because the RVID-based record-level serialization may hold even among the DML operations of the same transaction. If two DML operations of the same transaction touch the same database record and the earlier one is under the waiting status, then the next DML log entry may also be forwarded to the waiter queue. In this scheme, the commit processing should be performed after verifying that the DML log entries distributed to the waiter queue are replayed, such as by maintaining a reference counter per replayed transaction.

8.5 Replication Log Buffer Management for Better Scalability at the Primary

The enhanced mechanisms and techniques disclosed herein may introduce new sections implemented by a lock-free structure using an atomic CAS instruction. The replication log buffer (Section 3.2) and the per-table RVID generator (Section 3.1) are such cases at the primary. Although a CAS operation might still be problematic on multi-socket hardware, it may be practical and viable considering that there are already several pre-existing critical sections such as recovery log buffer and commit timestamp generator. In addition, the per-table RVID generator may result in more efficient query processing.

In spite of this, in the future, if the multi-socket synchronization overhead of CAS operation becomes a more visible issue (as the number of hardware sockets increases), it is another option to create multiple DML log buffers (one per hardware socket, for example) also at the primary side, similarly to the DML log buffers maintained for parallel replay at the replica. Together with these parallel DML log buffers at the primary, a single commit log buffer may be used to enforce the strict ordering of transaction commit log entries, but, by combining with the pre-existing group commit scheme, the access frequency to the shared commit log buffer may be further reduced.

8.6 Log Size Reduction

In order to reduce the size of the log that needs to be shipped, two potential improvements may be considered. First, the discussed sub-table replication (Section 8.1) may not only reduce the memory footprint required for the replica tables but may also reduce the size of the replication log that needs to be shipped. Second, applying a lossless data compression technique may be a further configuration option of ATR to reduce the physical network usage between the primary and the replicas. To reduce the CPU consumption involved for compression and decompression, exploiting hardware-accelerated data compression technique may be applied as programmable NIC and FPGA may be widely deployed in datacenter-scale.

8.7 Transaction-Consistent Online Replica Creation

In order to deal with dynamic variation of incoming workloads, it may be desirable to add or remove replicas without service downtime at run time. Particularly, with increasing demands of cloud computing and multi-tenant database systems, such elasticity is becoming an essential requirement for modern database systems.

To enable adding replicas online and in a transaction-consistent manner, the following protocol is possible with ATR. For initializing the target replica table, the primary may create a table snapshot (or checkpoint) image and copies it to the replica system. And, for the new changes occurred during the snapshot creation and copy operation, a replication log generator may be activated before creating the snapshot. At the replica side, if the After-Update RVID of a replication log entry is smaller than or equal to the current RVID value of the target replica record, then the replication log entry may be abandoned because its contained change may already be available at the replica side. After the table copy operation completes, the metadata manager is notified of the existence of new replica. Then, on the next query execution to the corresponding table, the newly added replica may become a possible candidate that is considered during query compilation.

In some embodiments, the snapshot creation is performed by a normal transaction which may follow the snapshot isolation consistency level. It means that the created snapshot contains only the committed database images. As a result, if at the time of creating the table snapshot an active transaction had already performed update operations without ATR log generation, then those previous update operations may end up not being reflected in any of the created table snapshots or the ATR log entries. To avoid this problem, when the snapshot creation transaction gets its transaction snapshot timestamp (or read timestamp), a short-term table lock may be acquired to disallow the running of any concurrent write transaction on the same table. The table lock may be released as soon as the snapshot timestamp is acquired, even before creation of a snapshot image of the table, in some embodiments.

8.8 Non-Disruptive Replica Creation Under 1-to-n Replication

Figure 17:
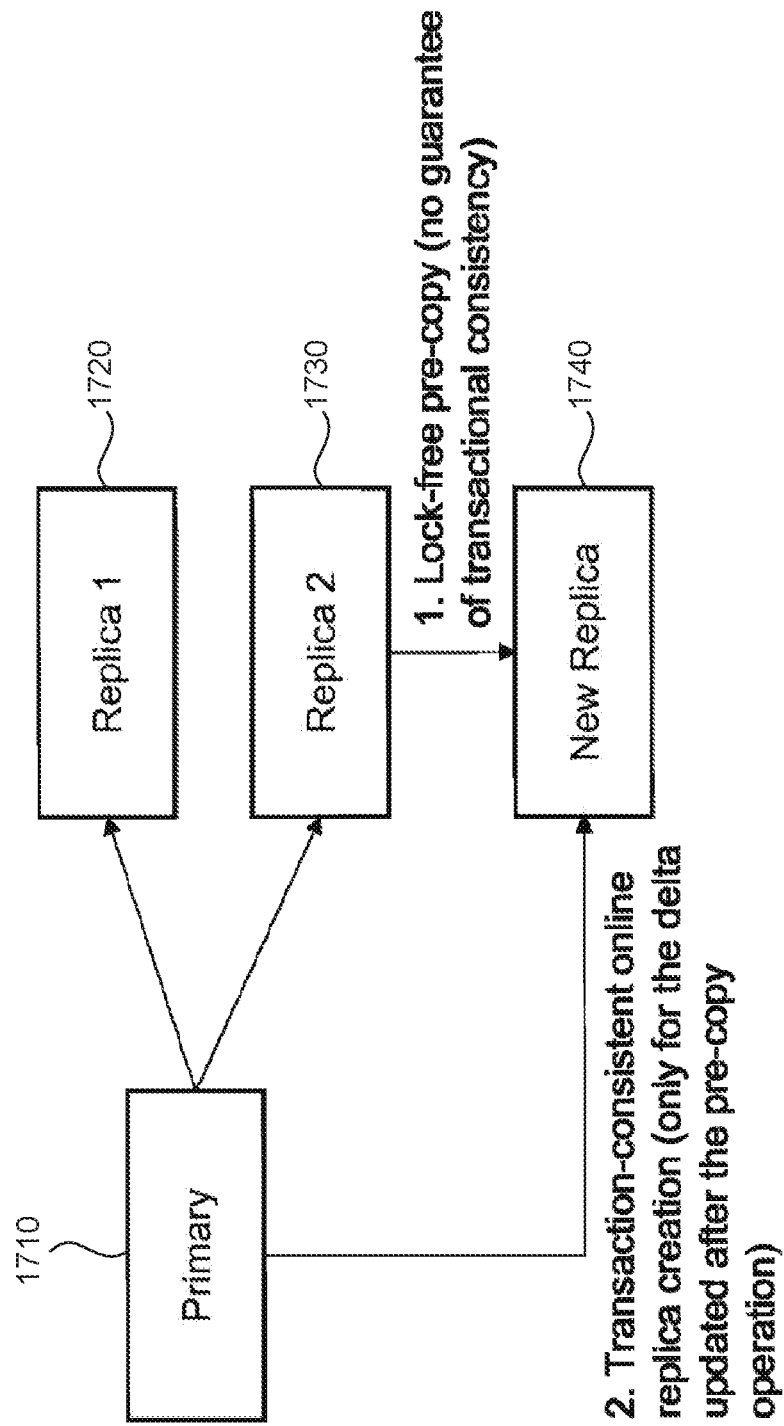
FIG. 17 shows an example of improved replica creation under 1-to-n replication configuration, according to some embodiments.

When there is already an active replica in the system, the table snapshot may be created not necessarily from the primary but from one of the existing replicas 1720 and/or 1730. Even though one of the existing replicas 1720 or 1730 may provide an outdated state of the table snapshot compared to the primary's, the gap may be filled by running the RVID-based recovery procedure of Algorithm 5 between the primary 1710 and the new replica 1740 as the next step, which is also illustrated in the example scenario 1700 of FIG. 17. With this option, consumption CPU and network resources of the primary 1710 system may be reduced during the online replica addition. Interference to the active write transactions running at the primary 1710 may also be reduced.

9 Related Work 9.1 Database Replication

Database replication is a widely studied and popular concept for achieving higher availability and higher performance. There are a number of different replication techniques depending on their purposes or application domains.

Cross-datacenter system replication is an option for increasing high availability against datacenter outages. For such a high availability purpose, other different replication options may be used, such as to focus on replicating database contents across data centers. Load balancing and scalable read performance by replicating a selected list of tables within a single data center may be an objective of replication, in some embodiments. Additionally or alternatively, ATR may be tuned for high availability or geo-replication.

When allowing the replication system to span heterogeneous database systems while decoupling the replication engine from the underlying DBMS servers or to transform the extracted source data as in ETL processing, in some embodiments, middleware-based database replication has been another practical technique. However, in some embodiments, replication engines may be embedded inside the DBMS kernel, aiming at real-time replication between systems without making any additional hops during the replication.

Depending on where the incoming write workloads may be processed, there are two replication options: master-slave replication and multi-master replication. In the multi-master replication, each replica may serve both read and write workloads. However, in order to make the replicas execute the write transactions in the same order even against conflicting transactions, the multi-master replication may need to involve a complex consensus protocol or the increased possibility of multi-node deadlocks. ATR may take a master-slave replication architecture, streamlining the transaction commit protocol and avoiding the danger of multi-master deadlocks. However, ATR may employ the transparent and automatic routing protocol as explained in Section 2 so that the application developer need not be concerned about the location of the primary copy of a particular table. Additionally, based on its table-wise replication feature, ATR may offer the option of the semi-multi-master replication as discussed in Section 8.3.

9.2 Lazy Replication

Compared to methods that may rely on eager (or synchronous) replication, ATR may follow lazy (or asynchronous) replication to reduce the overhead at the primary-side transaction execution. However, differently from those other lazy replication techniques, ATR may be improved to reduce the visibility delay between the primary and its replicas by employing additional features such as early log shipping and parallel log replay. Other techniques may be used to achieve stronger consistency under lazy replication by letting the replica-side read queries wait until certain conditions are met. It is similar to the eager replication option based on the reader-pays-cost model, discussed in Section 7. Regarding the early log shipping, similar concepts of immediate update propagation, which may not wait for the commit of the write transaction, may improve data freshness.

Lazy (or asynchronous) replication may be seen as a form of eventual consistency. There may be other variations of eventual consistency models and expected bounds on data staleness under eventual consistency models.

9.3 Parallel Replication

For parallel replay under lazy replication, some implementations may rely on a run-time inter-transaction dependency tracker, which may become a contention point as shown in Section 6.2. Compared to such a pessimistic parallel log replay approach, ATR may employ an optimistic lock-free parallel log replay algorithm by leveraging the record version ID of MVCC implementation. Transactions belonging to the same barrier group may be committed out of order but their changes become visible to the replica queries after the transactions in the barrier group are replayed and committed, in some embodiments. As a result, the barrier length may affect the log replay throughput and the visibility delay; for example, if the length of a barrier increases, the log replay throughput may increase, but the visibility delay may increase. In ATR, the commit log replay operations may be serialized by the single queue and single replayer, and the committed transaction results become immediately visible to the replica queries. In addition to the optimistic lock-free parallel log replay algorithm, with careful separation of the serialized portion of commit operations from the other parallelized DML, pre-commit, and post-commit operations, ATR achieves both high-throughput parallel log replay and shorter visibility delay.

9.4 Cross-Format Replication

The idea itself of scaling out mixed OLTP/OLAP workloads with replication is not a new one. For example, extending HyPer to achieve scalable analytics performance with a master-slave replication may be treated as a different approach from ATR to the extent that the redo log generated at the primary node may be multicast, while ATR may instead decouple the replication log from the redo log.

BatchDB is another approach, in which OLTP and OLAP replicas may have different storage layouts to efficiently handle hybrid OLTP and OLAP workloads. In spite of having similar goals, ATR is clearly distinguished from BatchDB in its internal mechanisms. One idea of BatchDB is to enqueue OLAP queries at replicas and then execute at a time in batches to implicitly share the resource among the executed queries. Although BatchDB also uses RowID for fast application of updates to replicated records, there is no deeper discussion on parallel replication based on RVID or log-less replica recovery. In addition, while BatchDB focuses only on lazy replication, ATR is extended also to high-performance eager parallel replication enabled by ATR for reducing the propagation delay between the primary and its replicas.

Such conventional logical logging mechanisms may also meet the need of cross-format replication naturally. However, as described in Section 2.2, recovery log format may be tightly coupled with the physical format of the target table type. Additionally, changing the recovery log format of already deployed production systems was not an easy practical option. Under this given background, the presently disclosed design decision to decouple and separate the replication log from the storage-level recovery log may thus result in several unconventional-but-practical possibilities such as early log shipping, RVID-based parallel log replay, and RVID-based log-less replica recovery.

Compared to such conventional logical logging mechanisms, maintaining two different logging code paths might be concerned. However, at least based on the proposed log-less replica recovery mechanism, the storage-level recovery log of the primary system may become a single point of truth for not only primary recovery but also replica recovery, and may prevent logical conflict or divergence between the primary and the replica during recovery.

9.5 Pub/Sub-Style Logical Replication

Databus is a source-agnostic change data capture system, which provides ways of capturing data change events from a source system in a transaction-consistent order. For this, it relies on Trigger or a parser of binary-format recovery log (in case that the format is interpretable). With this inherent decoupling between the source system and the change capture system, Databus may also be used to offer the cross-format logical replication. However, our proposed replication mechanism is differentiated from Databus in the following aspects.

- Contrasted to ATR's in-database replication (Section 2.2), Databus uses an external process (called replay process) to capture changes from the primary database (by Trigger of by parsing the recovery log).
- In this sense, as pointed out in Section 2.2, the approach in Databus may involve an additional network round-trip for replication, compared to the proposed ATR mechanism.
- Contrasted to push-based replication in ATR, Databus may pull the changes from the primary database first by the replay process and then again by the replication consumers (called subscription clients).
- Differently from ATR that relies on RVID for parallel log replay with record-wise partial ordering, Databus relies on a total ordering based on global commit timestamp to enforce the transactional ordering during replication. In addition, Databus does not discuss about any parallelism during replay. Moreover, because the commit timestamp is determined at the time of the transaction commit, it cannot take the advantage of the early log shipping disclosed herein.

In a summary, Databus has different design criteria from ATR in that it is designed primarily for focusing on reducing the propagation delay between the primary and its replicas.

Kafka is another well-known pub/sub messaging-based replication system. From the authors' perspectives, Kafka is orthogonal to ATR as disclosed herein. Compared to Kafka which provides an intermediate store with producer and subscriber APIs, ATR is more about (1) how to generate change logs from a source database system for replication and about (2) how to replay the generated replication logs for a target database system. In that sense, it is not impossible to combine ATR with a messaging system like Kafka. The generated ATR log entries may be stored in a remote messaging system and then, replicas may be registered to the messaging system as subscribers. The replicas, instead of receiving the ATR log entries directly from the primary system, may receive the ATR log entries by using the messaging system's consumer API. After receiving them, the proposed ATR parallel replay scheme may be applied at the subscriber side for better efficiency.

9.6 ETL

Although the background discussed above compares ATR with conventional ETL-based replication approach in Section 1, ETL may be used not only for replication but also for data transformation, which may help to accelerate reporting queries. However, contrasted to this conventional ETL-based OLAP system management, it may be desirable instead to follow a different principle of having a common physical database schema across OLTP and OLAP systems without relying on intermediate data transformation layers between them. This new architecture paradigm is beneficial not only for reducing the data propagation delay between OLTP and OLAP systems, but also for eliminating the application-side burden of maintaining the transformation rules between the physical database schema and the corresponding reporting queries used by business intelligence (BI) tools. For more systematic and consistent mapping between the physical database schema and BI tools, some embodiments may also offer to create a layered architecture of database views on top of the common database schema, instead of ETL-based application-managing data transformation. Some embodiments may additionally create database views on top of the ATR replicas.

10 Conclusion

Through extensive experiments with a concrete implementation available in a commercial main-memory DBMS product, it may be seen that ATR may achieve sub-second visibility delay for update-intensive workloads, providing scalable, OLAP performance without notable overhead to the primary. In addition, extending to eager replication, it may be seen how the ATR's parallel log replay and its log-less replica recovery mechanisms improve run-time transaction performance under eager replication.

Figure 18:
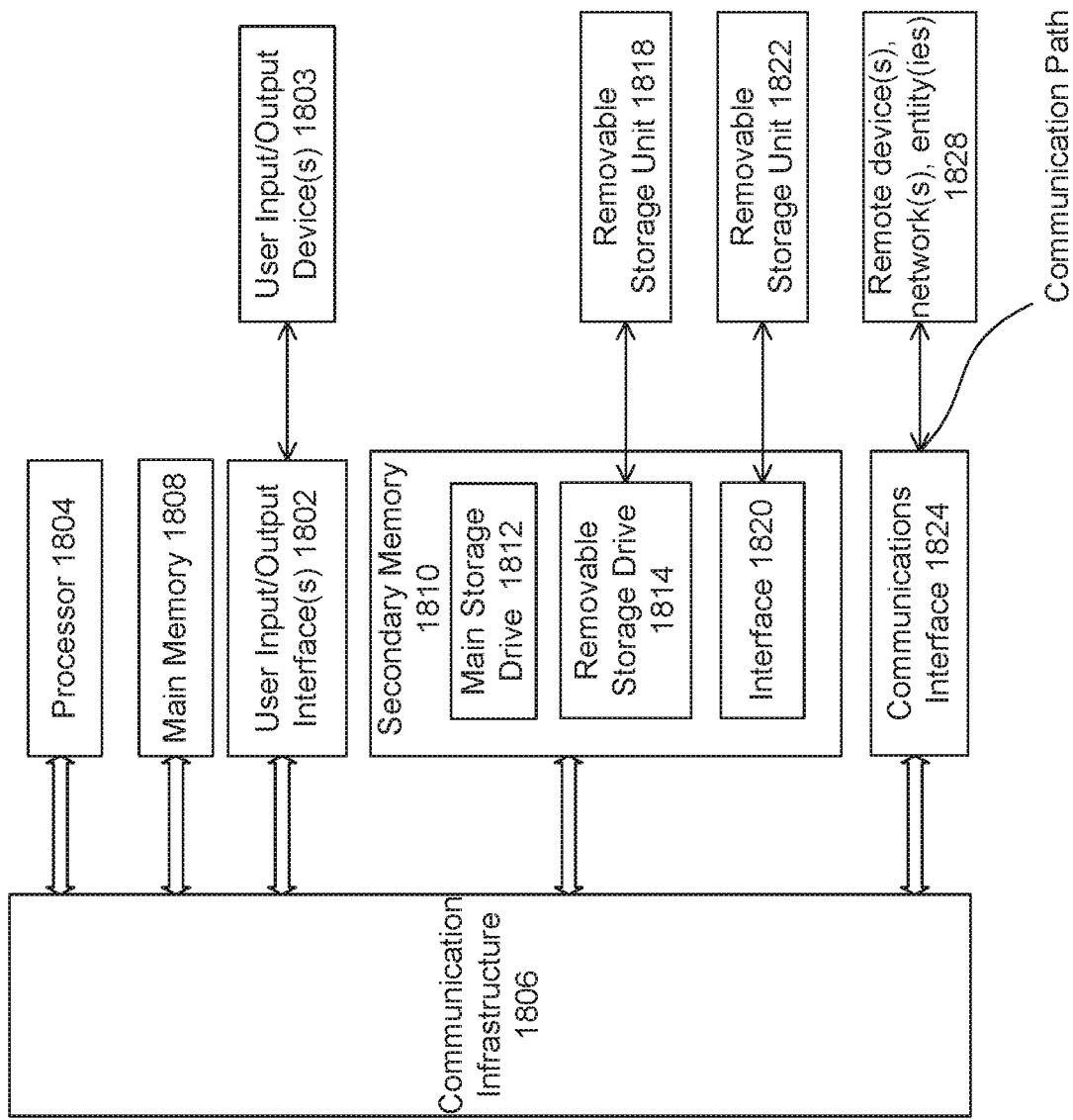
FIG. 18 shows an example computer system useful for implementing various embodiments.

Various embodiments may be implemented, for example, using one or more well-known computer systems, such as computer system 1800 shown in FIG. 18. One or more computer systems 1800 may be used, for example, to implement any of the embodiments discussed herein, as well as combinations and sub-combinations thereof.

Computer system 1800 may include one or more processors (also called central processing units, or CPUs), such as a processor 1804. Processor 1804 may be connected to a bus or communication infrastructure 1806.

Computer system 1800 may also include user input/output device(s) 1803, such as monitors, keyboards, pointing devices, etc., which may communicate with communication infrastructure 1806 through user input/output interface(s) 1802.

One or more of processors 1804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1800 may also include a main or primary memory 1808, such as random access memory (RAM). Main memory 1808 may include one or more levels of cache. Main memory 1808 may have stored therein control logic (i.e., computer software) and/or data.

Computer system 1800 may also include one or more secondary storage devices or memory 1810. Secondary memory 1810 may include, for example, a hard disk drive 1812 and/or a removable storage device or drive 1814. Removable storage drive 1814 may be a floppy disk drive, a magnetic tape drive, a compact disk drive, an optical storage device, tape backup device, and/or any other storage device/drive.

Removable storage drive 1814 may interact with a removable storage unit 1818. Removable storage unit 1818 may include a computer usable or readable storage device having stored thereon computer software (control logic) and/or data. Removable storage unit 1818 may be a floppy disk, magnetic tape, compact disk, DVD, optical storage disk, and/any other computer data storage device. Removable storage drive 1814 may read from and/or write to removable storage unit 1818.

Secondary memory 1810 may include other means, devices, components, instrumentalities or other approaches for allowing computer programs and/or other instructions and/or data to be accessed by computer system 1800. Such means, devices, components, instrumentalities or other approaches may include, for example, a removable storage unit 1822 and an interface 1820. Examples of the removable storage unit 1822 and the interface 1820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1800 may further include a communication or network interface 1824. Communication interface 1824 may enable computer system 1800 to communicate and interact with any combination of external devices, external networks, external entities, etc. (individually and collectively referenced by reference number 1828). For example, communication interface 1824 may allow computer system 1800 to communicate with external or remote devices 1828 over communication path 1826, which may be wired and/or wireless (or a combination thereof), and which may include any combination of LANs, WANs, the Internet, etc. Control logic and/or data may be transmitted to and from computer system 1800 via communication path 1826.

Computer system 1800 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

Computer system 1800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas in computer system 1800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture including a tangible, non-transitory computer useable or readable medium having control logic (software) stored thereon may also be referred to herein as a computer program product or program storage device. This includes, but is not limited to, computer system 1800, main memory 1808, secondary memory 1810, and removable storage units 1818 and 1822, as well as tangible articles of manufacture embodying any combination of the foregoing. Such control logic, when executed by one or more data processing devices (such as computer system 1800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 18. In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for parallel cross-format replication of databases, comprising:
   maintaining, by at least one processor, a replication log and a storage-level recovery log, wherein the replication log and the storage-level recovery log are each formatted according to separate respective log formats;
   logging, by the at least one processor, a record-level SQL execution result in at least one of the replication log and the storage-level recovery log; and
   replicating, by the at least one processor, at least one database table from a primary server to at least one replica server based at least in part on the replication log,
   wherein the primary server is configured to use a row-store table format, and the at least one replica server is configured to use a column-store table format, and
   wherein the replicating is performed asynchronously, according to an early log-shipping protocol, with respect to a specific entry of the replication log before completion of a transaction corresponding to the specific entry.

2. The computer-implemented method of claim 1, further comprising:
   replaying, by the at least one processor, at least one entry from at least one of the replication log and the storage-level recovery log, wherein the at least one entry comprises the record-level SQL execution result; and
   bypassing, by the at least one processor, an SQL execution engine upon the replaying of the at least one entry comprising the record-level SQL execution result.

3. The computer-implemented method of claim 1, wherein:
   at least one of the primary server and the at least one replica server is configured to store data according to at least one partitioning scheme.

4. The computer-implemented method of claim 3, wherein:
   the primary server's partitioning scheme is different from the at least one replica server's partitioning scheme.

5. The computer-implemented method of claim 1, wherein:
   the logging further comprises storing a snapshot timestamp associated with at least one entry committed to at least one of the replication log and the storage-level recovery log.

6. A system, comprising:
   a memory; and
   at least one processor coupled to the memory and configured to perform operations comprising:
   maintaining a replication log and a storage-level recovery log, wherein the replication log and the storage-level recovery log are each formatted according to separate respective log formats;
   logging a record-level SQL execution result in at least one of the replication log and the storage-level recovery log; and
   replicating at least one database table from a primary server to at least one replica server based at least in part on the replication log,
   wherein the primary server and the at least one replica server are each configured to store data according to one table format of a row-store table format and a column-store table format, and
   wherein the replicating is performed asynchronously, according to an early log-shipping protocol, with respect to a specific entry of the replication log before completion of a transaction corresponding to the specific entry.

7. The system of claim 6, wherein the processor is further configured to:
   replay at least one entry from at least one of the replication log and the storage-level recovery log, wherein the at least one entry comprises the record-level SQL execution result; and
   bypass an SQL execution engine upon the replaying of the at least one entry comprising the record-level SQL execution result.

8. The system of claim 6, wherein:
   at least one of the primary server and the at least one replica server is configured to store data according to at least one partitioning scheme.

9. The system of claim 8, wherein:
   the primary server's partitioning scheme is different from the at least one replica server's partitioning scheme.

10. The system of claim 6, wherein:
    the logging further comprises storing a snapshot timestamp associated with at least one entry committed to at least one of the replication log and the storage-level recovery log.

11. A computer-readable device having instructions stored thereon that, when executed by at least one computing device, causes the at least one computing device to perform operations comprising:

maintaining a replication log and a storage-level recovery log, wherein the replication log and the storage-level recovery log are each formatted according to separate respective log formats;

logging a record-level SQL execution result in at least one of the replication log and the storage-level recovery log; and replicating at least one database table from a primary server to at least one replica server based at least in part on the replication log, wherein the primary server is configured to use a column-store table format, and the at least one replica server is configured to use row-store table format, and wherein the replicating is performed asynchronously, according to an early log-shipping protocol, with respect to a specific entry of the replication log before completion of a transaction corresponding to the specific entry.

12. The computer-readable device of claim 11, the operations further comprising:

replaying at least one entry from at least one of the replication log and the storage-level recovery log, wherein the at least one entry comprises the record-level SQL execution result; and bypassing an SQL execution engine upon the replaying of the at least one entry comprising the record-level SQL execution result.

13. The computer-readable device of claim 11, wherein:
at least one of the primary server and the at least one replica server is configured to store data according to at least one partitioning scheme.

14. The computer-readable device of claim 13, wherein:
the primary server's partitioning scheme is different from the at least one replica server's partitioning scheme.

15. The computer-readable device of claim 11, wherein:
the logging further comprises storing a snapshot timestamp associated with at least one entry committed to at least one of the replication log and the storage-level recovery log.

16. The system of claim 6, wherein:
at least one of the replication log or the storage-level recovery log comprises a data manipulation language (DML) log entry for replay with the transaction corresponding to the specific entry.

17. The system of claim 16, the operations further comprising:

replaying the DML log entry in parallel with another transaction corresponding to another specific entry, following a multi-version concurrency control (MVCC) protocol.

18. The system of claim 6, wherein:
the replicating is performed synchronously with respect to another replica in the system.

19. The system of claim 6, wherein:
the replicating further comprises adaptive query routing, in accordance with an adaptive query-routing scheme comprising at least one rule.

20. The system of claim 19, wherein:
the at least one rule comprises exclusion of a given replica in response to logged metadata indicating that the given replica is unavailable.

* * * * *